(12) United States Patent
Zwart

(10) Patent No.: US 10,042,796 B2
(45) Date of Patent: *Aug. 7, 2018

(54) DIGITAL ACCESSORY INTERFACE CALIBRATION

(71) Applicant: Cirrus Logic International Semiconductor Ltd., Edinburgh (GB)

(72) Inventor: Willem Zwart, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 266 days.

This patent is subject to a terminal disclaimer.

(21) Appl. No.: 14/928,430

(22) Filed: Oct. 30, 2015

(65) Prior Publication Data

US 2016/0335211 A1 Nov. 17, 2016

(30) Foreign Application Priority Data

May 11, 2015 (GB) .................................. 1508000.5

(51) Int. Cl.
*G06F 13/42* (2006.01)
*G06F 13/362* (2006.01)
(Continued)

(52) U.S. Cl.
CPC ........ *G06F 13/3625* (2013.01); *G06F 13/385* (2013.01); *G06F 13/4068* (2013.01)

(58) Field of Classification Search
CPC ........................... G06F 13/4282; H04J 3/0635
See application file for complete search history.

(56) References Cited

U.S. PATENT DOCUMENTS

2004/0066775 A1 4/2004 Grovenburg
2004/0088445 A1* 5/2004 Weigold ................ G06F 13/426
710/8
(Continued)

FOREIGN PATENT DOCUMENTS

CN 1662008 A 8/2005
EP 0603600 A2 6/1994
(Continued)

OTHER PUBLICATIONS

Combined Search and Examination Report under Sections 17 and 18(3), Patent Application No. GB1508000.5, dated Nov. 9, 2015, 5 pages.
(Continued)

*Primary Examiner* — Albert Wang
(74) *Attorney, Agent, or Firm* — Jackson Walker L.L.P.

(57) ABSTRACT

An audio system comprises a master device; a slave device; and a wired connection, suitable for connecting the master device and the slave device, and having at least two wires. In order to compensate for a round-trip transmission delay, a method comprises: transmitting a master clock signal on a first wire of the two wires, from said master device to said slave device; transmitting a synchronisation data pattern on a second wire of the two wires, from said slave device to said master device, wherein said synchronisation data pattern comprises signal level transitions at timings that are set based on a delay value stored in said slave device; in said master device, determining timings of said signal level transitions as received at said master device; transmitting, on the second wire, from said master device to said slave device, timing delay control data based on said determination; and in said slave device, receiving said timing delay control data; and updating said stored delay value based on said timing delay control data.

23 Claims, 19 Drawing Sheets

(51) Int. Cl.
*G06F 13/38* (2006.01)
*G06F 13/40* (2006.01)

(56) References Cited

U.S. PATENT DOCUMENTS

| | | |
|---|---|---|
| 2005/0243733 A1 | 11/2005 | Crawford et al. |
| 2007/0008896 A1 | 1/2007 | Green et al. |
| 2008/0168200 A1 | 7/2008 | Kim |
| 2015/0339257 A1* | 11/2015 | Hug .......................... H04L 5/16 710/110 |

FOREIGN PATENT DOCUMENTS

| | | |
|---|---|---|
| EP | 0817419 A2 | 7/1998 |
| EP | 1575200 A2 | 9/2005 |

OTHER PUBLICATIONS

International Search Report and Written Opinion, International Application No. PCT/GB2015/053265, dated Mar. 30, 2016, 11 pages.

* cited by examiner

| Frame# | Bi-Dir Control | | Data up | | | | Data down | | | Unused |
|---|---|---|---|---|---|---|---|---|---|---|
| | ↓ | ↓ | Nup ↑ | | ↑ | ↓ | Ndown | | ↑ | ↑ |
| | | | N_Symbols | | | | | | | |
| 0 | Ctrl0↓ | PDMA↑ | PCMA↑ | PCMA↑ | | PCMD↓ | PCMD↓ | PCMD↓ | PCMF↓ | x |
| 1 | Ctrl1↑ | PDMA↑ | PCMB↑ | PCMB↑ | PCMB↑ | PCMD↓ | PCMD↓ | PCMD↓ | PCMF↓ | x |
| 2 | Ctrl2↓ | PDMA↑ | PCMA↑ | PCMA↑ | | | PCME↓ | PCMD↓ | PCMF↓ | x |
| 3 | Ctrl3↑ | PDMA↑ | PCMB↑ | PCMB↑ | PCMB↑ | | PCME↓ | | PCMF↓ | x |
| 4 | Ctrl4↑ | PDMA↑ | PCMA↑ | PCMA↑ | | PCMD↓ | PCMD↓ | PCMD↓ | PCMF↓ | x |
| 5 | Ctrl5↓ | PDMA↑ | PCMB↑ | PCMB↑ | PCMB↑ | PCMD↓ | PCMD↓ | PCMD↓ | PCMF↓ | x |
| ... | | | | | | | | | | |
| 126 | Ctrl126↑ | PDMA↑ | PCMA↑ | PCMA↑ | | | PCME↓ | | PCMF↓ | x |
| 127 | Ctrl127↑ | PDMA↑ | PCMB↑ | PCMB↑ | PCMB↑ | | PCME↓ | | PCMF↓ | x |
| 0 | Ctrl0↓ | PDMA↑ | PCMA↑ | PCMA↑ | | PCMD↓ | PCMD↓ | PCMD↓ | PCMF↓ | x |

Figure 3

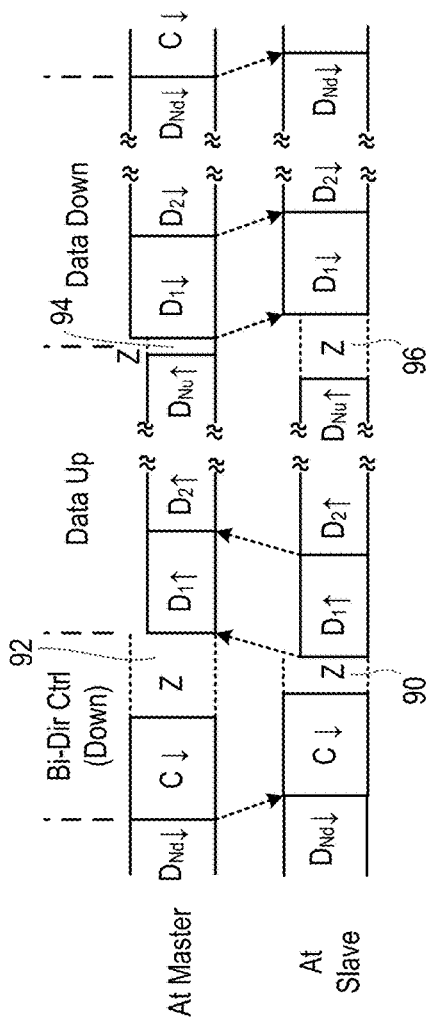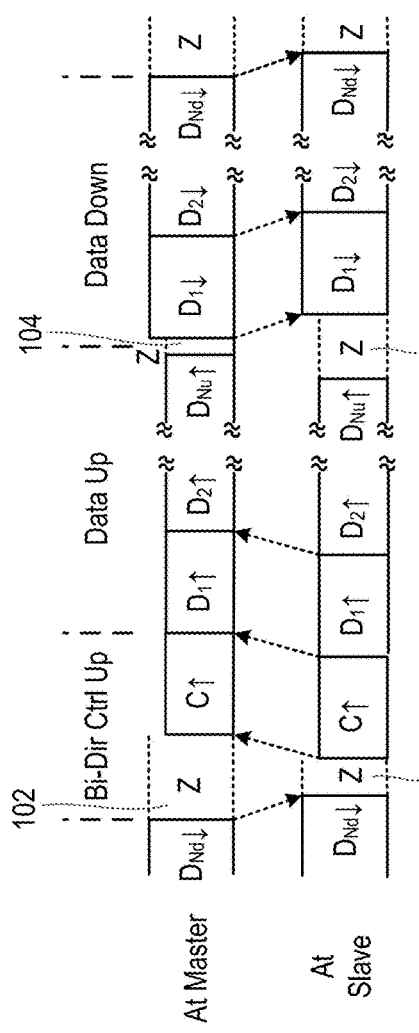

| ADDR | address0 | WR | data0 |

Figure 8

| ADDR | address1 | ADDR | WR | address0 | WR | data0 |

Figure 9

| ADDR | address0 | WR | data0 | WR | data1 | WR | data2 | WR | data3 |

Figure 10

| ADDR | address0 | RD | data0 |

Figure 11

| ADDR | address1 | ADDR | address0 | RD | data0 |

Figure 12

| ADDR | address0 | RD | data0 | RD | data1 |

Figure 13

DIGITAL ACCESSORY INTERFACE CALIBRATION

FIELD OF DISCLOSURE

This invention relates to a method of transferring data over a wired communications link. In particular, it relates to an interface that is suitable for example for transferring digital data between a master device and a slave.

BACKGROUND

When connecting two devices, for example a master device and a slave device, it may be required to transmit signals from the master device to the slave device and from the slave device to the master device.

In order to allow the signals from the transmitting device to be detected accurately by the receiving device, it is necessary to establish synchronization between the devices. One issue that arises with a bidirectional link is the need to take account of the transmission delay between the transmitting device and the receiving device. For example, when one data symbol is transferred in a first direction from a first device to a second device, it arrives at the second device after a certain time delay. Then, if the requirement is that the next data symbol should be transmitted from the second device to the first device, there is a further transmission delay before that next data symbol is received by the first device.

One possibility is to embed timing information in data transmitted on a bidirectional link that includes a single wire (or wire pair). However, this involves extra circuitry and system design complications because of the need to recover the clock and data from a combined data stream.

SUMMARY

According to an aspect of the invention, there is provided a method of compensating for a round-trip transmission delay in an audio system comprising: a master device; a slave device; and a wired connection, suitable for connecting the master device and the slave device, and having at least two wires. The method comprises: transmitting a master clock signal on a first wire of the two wires, from said master device to said slave device; transmitting a synchronisation data pattern on a second wire of the two wires, from said slave device to said master device, wherein said synchronisation data pattern comprises signal level transitions at timings that are set based on a delay value stored in said slave device; in said master device, determining timings of said signal level transitions as received at said master device; transmitting, on the second wire, from said master device to said slave device, timing delay control data based on said determination; and in said slave device, receiving said timing delay control data; and updating said stored delay value based on said timing delay control data.

According to another aspect of the invention, there is provided an audio system configured for performing the method.

According to another aspect of the invention, there is provided a method of compensating for a round-trip transmission delay in an audio system comprising: a master device; a slave device; and a wired connection, suitable for connecting the master device and the slave device, and having at least two wires. The method comprises, in the master device: transmitting a master clock signal on a first wire of the two wires, to said slave device; receiving from said slave device a synchronisation data pattern on a second wire of the two wires, wherein said synchronisation data pattern comprises signal level transitions at timings that are set based on a delay value stored in said slave device; determining timings of said signal level transitions as received at said master device; transmitting, on the second wire, to said slave device, timing delay control data based on said determination.

According to another aspect of the invention, there is provided a master device configured for performing the method.

According to another aspect of the invention, there is provided a method of compensating for a round-trip transmission delay in an audio system comprising: a master device; a slave device; and a wired connection, suitable for connecting the master device and the slave device, and having at least two wires. The method comprises, in the slave device: receiving from said master device a master clock signal on a first wire of the two wires; transmitting a synchronisation data pattern on a second wire of the two wires, to said master device, wherein said synchronisation data pattern comprises signal level transitions at timings that are set based on a delay value stored in said slave device; receiving, on the second wire, from said master device, timing delay control data based on said determination; and receiving said timing delay control data; and updating said stored delay value based on said timing delay control data.

According to another aspect of the invention, there is provided a slave device configured for performing the method.

When multiple method steps are specified, it will be appreciated that the order in which the steps are carried out may or may not be the order in which the steps are listed.

BRIEF DESCRIPTION OF THE DRAWINGS

For a better understanding of the present invention, and to show how it may be put into effect, reference will now be made, by way of example, to the accompanying drawings, in which:

FIG. 3 illustrates a frame structure;

FIGS. 4 to 6 illustrate the timing of signals between first and second devices;

FIGS. 8 to 17 illustrate the format of various commands;

DETAILED DESCRIPTION

Figure 1A:
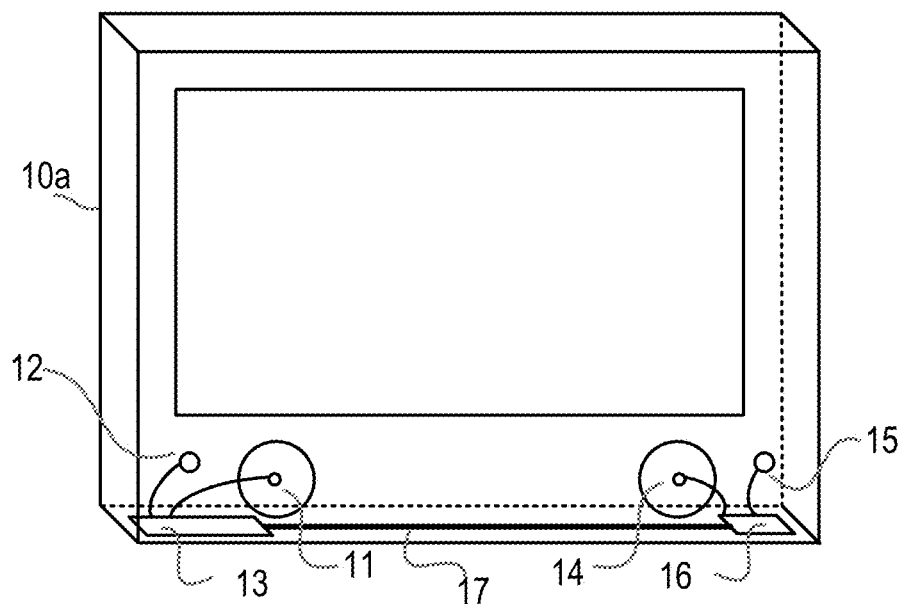
FIG. 1a and FIG. 1b illustrate systems in accordance with an aspect of the invention.

FIG. 1(a) shows an audio system, as just one example of a system using the methods described herein.

In this example, the methods described herein are used in a television set 10a. The television set 10a includes a first speaker 11 and voice-input microphone 12, which are connected to master circuitry 13, and also includes a second speaker 14 and voice-input microphone 15, which are connected to slave circuitry 16. The master circuitry 13 and the slave circuitry 16 are connected by means of a wired connection 17.

The master circuitry 13 may for example provide audio signals to the slave circuitry 16 for playback through the second speaker 14. Conversely, voice input signals produced by the second voice-input microphone 15 may be provided via the slave circuitry 16 to the master circuitry 13. Signals transmitted between the master circuitry 13 and the slave circuitry 16 are passed over the wired connection 17.

This wired connection may comprise tracks on a printed circuit board (PCB) or wires in a cable, possibly passing through internal plug and socket arrangements for example PCB edge connectors. The wired connection may pass though connectors between component parts of an audio system which are detachable, for example the keyboard and screen portions of a tablet computer with attachable keyboard.

The master circuitry 13 may for example take the form of an audio codec.

In the case of a widescreen television set, the time taken for signals to be passed between the master circuitry 13 and the slave circuitry 16 is significant. This time may also be significant in many other devices, including laptop or tablet computers.

Figure 1B:
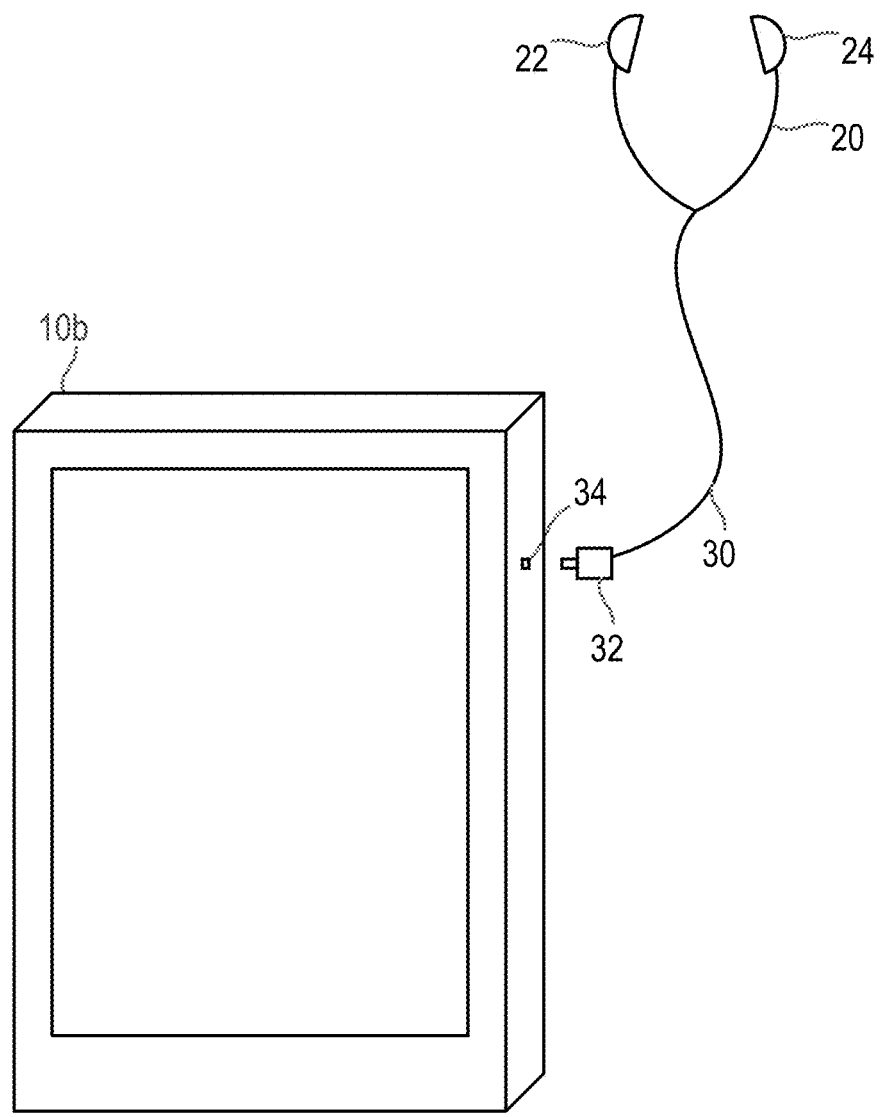

FIG. 1(b) shows another audio system, as another example of a system using the methods described herein.

Specifically, FIG. 1(b) shows a host 10b, which in this example takes the form of a smartphone, but which may be any product, in particular a portable communications device. The method may be used in situations where the host is a portable audio device, but may also be used in other situations. In this example, the host 10b has audio processing capability.

FIG. 1(b) also shows an accessory 20, which in this example takes the form of a pair of earphones, but which may be any device, in particular any audio accessory. In this example, the pair of earphones has two earpieces 22, 24, each of which includes a speaker for reproducing sound in response to audio signals transferred from the host 10b. Each of the earpieces 22, 24 also includes at least one microphone, for example for detecting ambient noise in the vicinity of the wearer.

Signals representing the ambient sound are then transferred from the earphones to the host 10b, which performs a noise cancellation function using an algorithm and generates anti-noise signals that it transfers to the earphones for playback. The effect of playing back the anti-noise signals is that the level of ambient noise heard by the wearer is reduced, and the wanted sounds (music, speech, or the like) that are also being transferred from the host device 10b are therefore more audible.

The accessory 20 may be connected to the host 10b by means of a cable 30. The cable 30 is detachable from at least one of the portable communications device and the audio accessory. In some embodiments, the cable 30 is permanently attached to the accessory 20, and may be provided with a conventional 4-pole TRRS jack 32, to allow mechanical and electrical connection to or disconnection from the host 10b via a matching 4-pole socket 34 provided on the host. In other examples, the cable may be in any suitable format, for example it may have a USB Type-C connector, which similarly has four poles available for an audio interface.

As a further alternative, the accessory 20 (or the host 10b) may be provided in a USB Stick dongle, with data being transferred between the dongle and the other device over a USB Type-C-compliant wired communications link.

In other cases, the accessory 20 is permanently connected to the host 10b, and both may be parts of a larger piece of equipment.

As described with reference to FIG. 1(a), the time taken for signals to be passed between the host 10b and the accessory 20 is significant, for example compared with the period of each pulse in the data signal being transferred.

Figure 2:
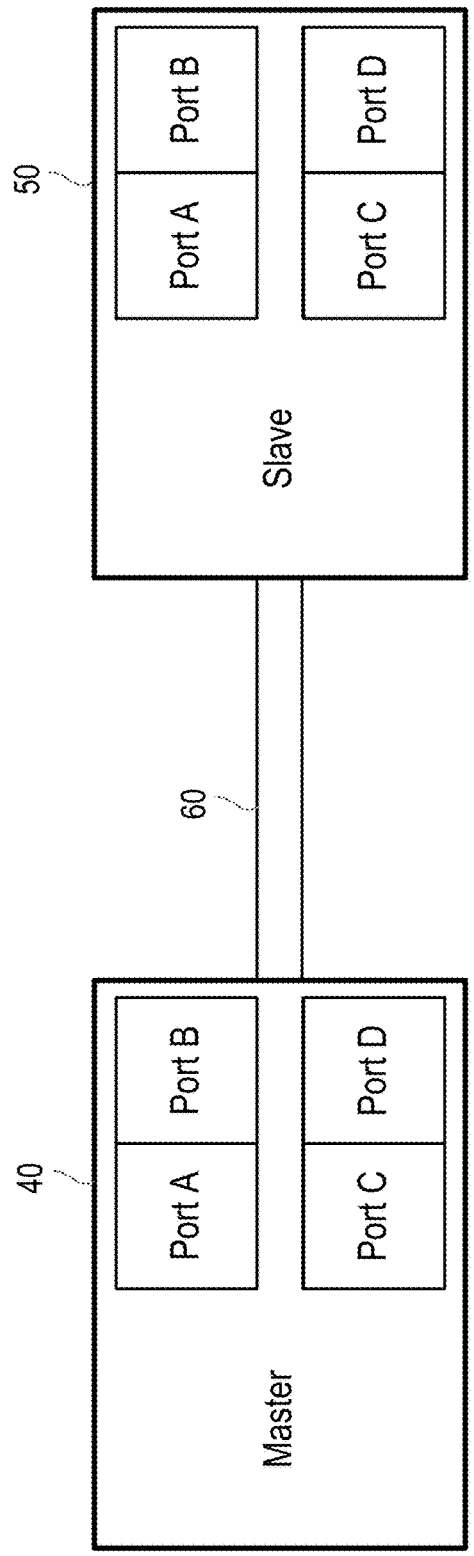
FIG. 2 illustrates a logical topology of the system.

FIG. 2 shows the logical topology of the system. Thus, FIG. 2 shows a master device 40 and a slave device 50 connected through a bus 60. The master device 40 and the slave device 50 each typically have multiple audio ports A, B, C, D for example. The method described herein allows isochronous streams of data to flow between these ports, either from master to slave (referred to herein as the "down" direction) or from slave to master (referred to herein as the "up" direction). Any port on the bus is either a source or a sink. Source ports provide the isochronous streams, while sink ports receive them. Source and sink ports can both live on either master or slave.

For illustration, in the example shown in FIG. 1(b), the master device 40 may be provided in the host device 10b, while the slave device 50 may be provided in the accessory 20.

In this case, the source ports are devices that generate data, for example such as a microphone in one of the earpieces 22, 24, or an output of a processing device in the host device 10b. The sink ports are devices that receive data, for example such as a speaker in one of the earpieces 22, 24, or an input of a processing device in the host device 10b.

As examples, the ports may provide or receive oversampled audio data, such as pulse density modulated (PDM) data, or pulse-code modulated (PCM) data, or bulk data, as examples. In the case of audio data, using oversampled data allows the data to be generated, transmitted, and processed with lower latency, and is therefore advantageous for transferring data used in noise cancellation processing where there are important time constraints on the time taken to generate the noise cancellation signals from the detected ambient noise, while PCM, being a lower sample rate but multi-bit, inherently gives rise to longer latency but is generally more efficient in terms of overall bit rate.

In operation, data may be transmitted in a half-duplex fashion up and down between master and slave via a single wire of a wired communications link. A clock may be transmitted down a second single wire. A third wire may be used to provide power from the host to the accessory or to communicate information. A fourth wire may serve as ground return. Thus a standard 4-pole jack and socket arrangement may be used. Alternatively four (or more) wires of a standard USB or USB-On the Go connector or a multi-pole connector such as the USB Type-C connector may be used.

In other embodiments, the clock and/or data signals may each be transmitted by in the form of a differential pair of signals along a balanced pair of wires, for example to reduce emission or sensitivity to electromagnetic interference at the expense of more wires and more complex driver and receiver circuitry.

Data bits are encoded into symbols. In an embodiment employing differential transmission, by way of example only, a single symbol encodes a single bit, such that transmission of a data bit with a value of '0' corresponds to a logic high level applied on a first wire and a logic low level applied on a second wire, whereas transmission of a data bit with a value of '1' corresponds to a logic low level applied on a first wire and a logic high level being applied on a second wire. The described invention can be applied using various encoding methods, irrespective of the number of wires involved to encode the symbols, and of the number of data bits that are encoded in a single symbol.

FIG. 3 shows the format in which data is transferred between the master device and the slave device in an embodiment. The interfaces from the master host device to the slave accessory are designed and configured in use such that data is transmitted in the format of a superframe, which in the illustrated example comprises 128 frames, numbered from 0 to 127 in the first column of FIG. 3. Each frame has the same configurable number (N_Symbol) of symbol slots.

The number N_Symbol may for example be configurable to be in the range of 8 to 20. For example, N_Symbol may have a default value of 12, which can be varied if required.

During each symbol slot, one and only one of the interfaces on the bus (i.e. the master or the slave) can transmit a symbol on the bus. If the two interfaces simultaneously attempted to drive a data symbol on the bus, conflicting drive currents would prevent correct transfer of data symbols between the interfaces, even if the time during which the two interfaces drive simultaneously only comprises a fraction of a symbol slot period. Therefore the frame and superframe structure enables a strict orchestration in which each specific symbol slot is allocated for either the master or the slave to be transmitting while the other is receiving.

In addition, correct transfer of data symbols requires that a first interface does not transmit during any next symbol slot until any symbol as transmitted in the preceding symbol slot by a second interface on the bus has been completely transferred, including the transmission delay over the cable associated with the transfer.

Each frame contains a number of symbol slots dedicated for use for transmitting control data. In the illustrated example, only a single symbol slot for control data per frame is provided, as this will be adequate for many purposes. Control data may be transmitted from the master to the slave in some frames, and from the slave to the master in other frames. Where there are multiple symbol slots allocated for control data in each frame, it is possible to allocate one or more of these symbol slots for transmitting control data from the master to the slave, and one or more of these symbol slots for transmitting control data from the slave to the master, in at least some frames.

Each frame may be configured in use to allow transmission of a number of symbols (Nd) of payload data down from master to slave and a number of symbols (Nu) of payload data up from slave to master in a half-duplex fashion. These numbers may be the same for all frames of the superframe.

To avoid overhead or dead time when changing transmission direction, the order of the control symbols and components of signal (i.e. payload) data up and down is constrained so that only one pair of reversals of transmission direction occurs in each frame. A single symbol slot may thus be adequate to accommodate a maximum transmission delay between master and slave and back again from slave to master.

FIG. 3 shows this single symbol slot as "unused". The position of this unused symbol slot in the frame is explained in more detail below.

Thus the maximum total number of up and down signal data symbols may be N_symbol less the number of control symbols, and less the one further symbol to allow for transmission delay. In the case of one control symbol, this allows the transmission of up to (N_symbol minus 2) signal data symbols per frame. For N_symbol of, say, 20 this gives a symbol slot utilisation factor of 90%. In other words, the total number of symbol slots usable for control symbols, data up and data down is only one less than N_symbol.

The common length (N_symbol) of the frames in a superframe and the allocation of symbols in the various frames of the superframe may be programmed on the fly in use. The frame rate may be predetermined, and the symbol rate increased to accommodate larger numbers of symbols per frame, to preserve the latency, rather than keeping the symbol rate constant and reducing the frame rate.

The allocation of the data symbols may be different from frame to frame in a superframe. This flexibility advantageously allows bitstream oversampled data to pass through with minimal delay, while allowing multi-bit PCM words to be packed efficiently and conveniently and allowing minimisation of any transmission latency. The bidirectional control channel may also be advantageously reconfigured on-the-fly, to accommodate different scenarios requiring more or less control data to be passed up or down the link.

FIG. 3 shows how different data streams may be transmitted on the bus at the same time. Thus, FIG. 3 shows:
i) a first PCM data stream (PCMA) being transmitted from the slave to the master in two symbol slots of each even-numbered frame;
ii) a second PCM data stream (PCMB) being transmitted from the slave to the master in three symbol slots of each odd-numbered frame;
iii) a third PCM data stream (PCMD) being transmitted from the master to the slave in three symbol slots of the first two frames of each block of four consecutive frames; a fourth PCM data stream (PCME) being transmitted from the master to the slave in one symbol slot of the last two frames of each block of four consecutive frames; a first PDM data stream (PDMA) being transmitted from the slave to the master in one symbol slot of each frame; and
iv) a second PDM data stream (PDMF) being transmitted from the master to the slave in one symbol slot of each frame.

FIG. 3 also shows how the control symbols are transmitted from the master to the slave in some frames (for example frames 0, 1 and 2) and from the slave to the master in other frames (for example frames 3 and 4).

Figure 4:
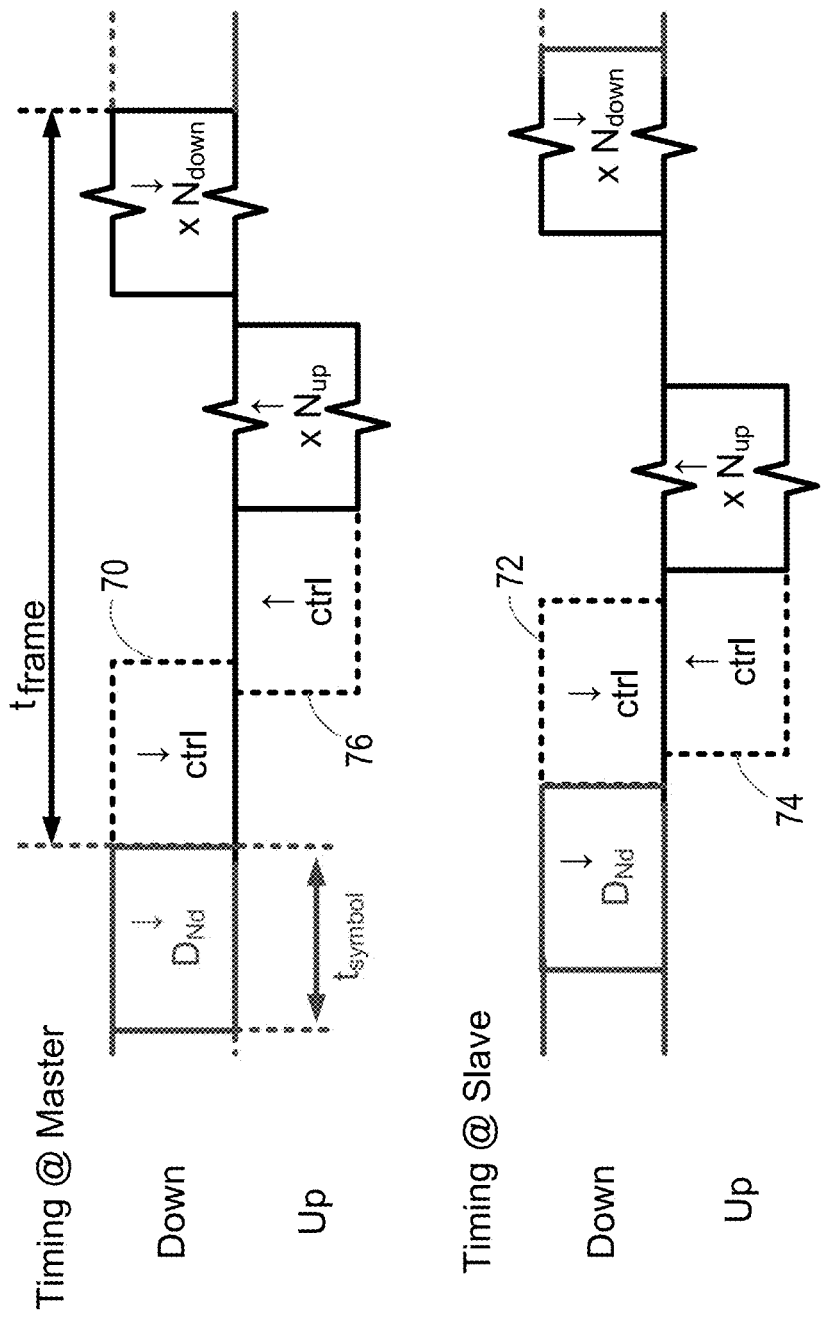

FIG. 4 shows the effect of the transmission delays. Specifically, in FIG. 4, the upper graph shows the frame format with time as observed on the master side, and the bottom graph shows the perception of time on the slave side. In each graph, symbols above the respective central horizontal line represent the symbols driven by the master, while symbols below the respective central horizontal line represent the symbols driven by the slave. The direction of transmission of each symbol is also indicated by up or down arrows, with transmission from the master to the slave being defined as "down", and transmission from the slave to the master being defined as "up". The frame period is defined in this diagram as $t_{frame}$, while the symbol period is defined as $t_{symbol}$.

The last symbol in the previous frame may be a data symbol transmitted down from master to slave as illustrated.

The first symbol in a frame is a control (ctrl) symbol. Together the 128 control symbols of a single superframe, one taken from each frame, constitute the control frame, as described in more detail below. Each symbol in the control frame may flow in either direction. The direction in which each symbol of control data flows is defined by prior data bits in the control frame and is governed by the master.

FIG. 4 illustrates two alternative possibilities, which cannot both take place in the same frame. Thus, FIG. 4 shows a control symbol being transmitted by the master at 70 and received by the slave at 72 after a transmission delay. FIG. 4 also shows the alternative possibility, with a control symbol being transmitted by the slave at 74 and received by the master 76 after a transmission delay.

The following $N_{Up}$ symbol slots carry audio data from the slave. There is an empty slot in which neither the master nor the slave transmit any data. Note that on the master side a significant fraction of the last data symbol of the up data from the slave will be coming in during this empty slot. Data bits during these $N_{UP}$ symbol slots in the superframe can be encoded and grouped in a series of consecutive symbols to convey audio streams between source ports on the slave and sink ports on the master.

The following $N_{Down}$ symbol slots carry audio data from the master to the slave. Similarly data bits during this phase can be encoded and grouped in a series of consecutive symbols to convey audio streams between source ports on the master and sink ports on the slave.

The number of symbol slots allocated for data is determined by the total number of symbol slots per frame. That is, $(N_{UP}+N_{Down}) \leq (N\_Symbol-2)$.

FIG. 5 illustrates one example of the timing in more detail.

As before, each frame has a control symbol which may be transmitted in either direction, then a series of data symbols $D_1, D_2, \ldots, D_{Nu}$ transmitted from the slave to the master, and a series of data symbols $D_1, D_2, \ldots, D_{Nd}$ transmitted from the master to the slave. A respective transmission delay applies to transmissions in both directions. Symbols transmitted from the slave to the master are illustrated with slightly lower heights than symbols transmitted from the master to the slave, but this is simply for illustrative purposes and has no physical meaning.

Specifically, FIG. 5 illustrates the case in which the bidirectional control slot is allocated for transmission of control data from the master to the slave.

In this case, the slave receives the control symbol, and then transmits the first data up symbol after a delay indicated by the reference numeral 90. Because of the transmission delays in both directions and the delay 90 within the slave, there is a delay indicated by the reference numeral 92 between the time at which the master transmits the control symbol and the time at which the master receives the first data up symbol. During this delay 92, the master device enters a high impedance state Z, during which there is no observable effect at the master device of either device driving the wire. Similarly, during the delay 90, the slave device enters a high impedance state Z, during which there is no observable effect at the slave device of either device driving data onto the wire. However the physical signals at each end of the wire may be affected by passive or active line impedance termination components attached to the wire. For instance a differential pair of transmission wires may include a pair of resistors of value equal to the nominal line impedance coupled from respective wires to a common bias voltage, to prevent transmission line reflections. As another example, a weak pull-up or pull-down may be provided at the end of a single-wire link to provide a default logic level when a device is powered down.

Data from the master to the slave is transmitted synchronous to a master symbol transmission clock (not illustrated) corresponding to a symbol period. Thus when the direction of data transfer is reversed again, the first data symbol down is not transmitted until a whole number of symbol periods since the previous symbol transmitted down (in this case the control symbol sent just prior to delay 92). Thus there is a further delay 94 between when the master receives the last data up symbol until it transmits the first data down symbol. Because of the transmission delays in both directions and this additional delay 94, there is a delay indicated by the reference numeral 96 between the time at which the slave transmits the last data up symbol and the time at which the slave receives the first data down symbol. During the delay 94, the master device enters a high impedance state Z, during which there is no observable effect at the master device of either device driving the wire. Similarly, during the delay 96, the slave device enters a high impedance state Z, during which there is no observable effect at the slave device of either device driving data onto the wire.

Thus, there is a delay at each device when the direction of data flow is changed. The two delays 92, 94 seen at the master device have the same total length as the two delays 90, 96 seen at the slave device. In this example, these two delays, in each case, total one symbol period $t_{symbol}$. Because there are only two such reversals of the data transfer direction in each frame, the total time associated with the transmission delay is smaller than it would be with more direction changes.

FIG. 6 illustrates another example of the timing, with the same frame structure as in FIG. 5, but in the case in which the bidirectional control slot is allocated for transmission of control data from the slave to the master.

In this case, the slave transmits the control data symbol after a delay indicated by the reference numeral 100. Because of the transmission delays in both directions and the delay 100 internal to the slave, there is a delay indicated by the reference numeral 102 between the time at which the master transmits the last symbol of the previous frame and enters a high-impedance state and the time at which the master receives the control symbol.

There is in this case no need for a delay between the transmission of the control symbol and the first data up symbol. There is a further delay only when the direction of data transfer is reversed, That is, when the master receives the last data up symbol, it transmits the first data down symbol after a delay indicated by the reference numeral 104 due to waiting for the next edge of the master symbol transmission clock. Because of the transmission delays in both directions and this delay 104, there is a delay indicated by the reference numeral 106 between the time at which the slave transmits the last data up symbol and the time at which the slave receives the first data down symbol.

Again, there is a delay at each device when the direction of data flow is changed, and there are only two such direction changes in each frame, even though the control symbol is in the opposite direction to that shown in FIG. 5. The two delays 102, 104 seen at the master device have the same total length as the two delays 100, 106 seen at the slave device. Again, these two delays, in each case, total one symbol period $t_{symbol}$. As before, during the delays 102, 104, the master device enters a high impedance state Z, during which there is no observable effect at the master device of either device driving the wire. Similarly, during the delays 100, 106, the slave device enters a high impedance state Z, during which there is no observable effect at the slave device of either device driving data onto the wire.

This ensures that a maximally large portion of the frame period can be used effectively for transferring data, inherently optimizing the number of data symbols that can be transferred per unit of time, given the constraints for latency and the required overhead to synchronize two devices on either side of the interface. As a consequence of the ordering of the symbol slots as described, the direction of the data in the control symbol has no impact on the maximal number of data symbols that can be transferred per unit of time.

Figure 7:
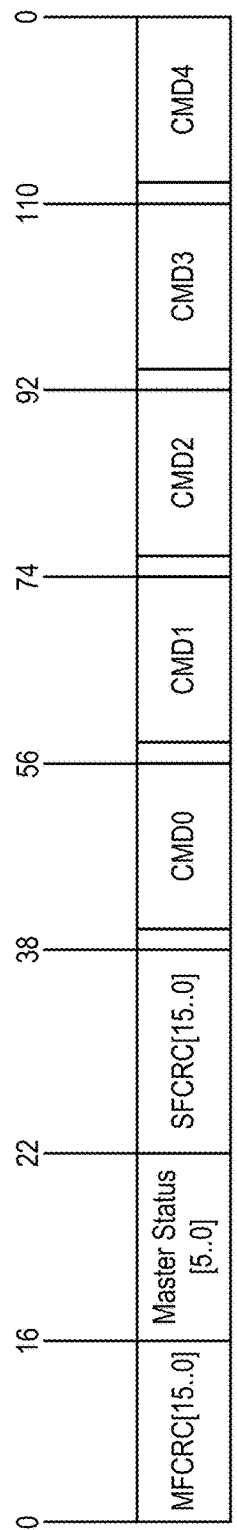
FIG. 7 illustrates a command frame structure.

FIG. 7 shows the structure of a control frame, as discussed above. In this example, the control frame consists of one symbol in each frame of a superframe, so the control frame comprises 128 symbols in total, where each symbol encodes a single bit As mentioned above, data in the control frame can flow in either direction. The direction in which the data flows is defined by a set of rules, which ensure that both master and slave know the direction during each symbol slot that is part of the control frame.

The following description of the control frame talks about bit slots, assuming that any symbol slot conveys one bit, though the described mechanism can be applied for any encoding scheme (i.e. 2 or more data bits per symbol) as long as data symbols only encode data bits flowing in a single direction.

In this illustrated example:
i) bits 0-15 of the control frame consist of a Master Super Frame Cyclic Redundancy Check (CRC), MSFCRC, holding the CRC over the data sent by the master in the previous Super Frame;
ii) bits 16-21 of the control frame indicate the status of the Master;
iii) bits 22-37 of the control frame consist of a Slave Super Frame CRC (SSFCRC) containing the CRC over the data sent by the slave in the previous Super Frame; and
iv) bits 38-55, 56-73, 74-91, 92-109 and 110-127 contain a sequence of five commands, CMD0, CMD1, CMD2, CMD3 and CMD4, each consisting of eighteen bits, and used to perform control data transfer between the master and the slave.

As mentioned above, bits 16-21 of the control frame indicate the status of the Master. More specifically, in one example, the 6-bit Master Status holds the following Master Status bits:

| Section | Bit Slots | Description |
| --- | --- | --- |
| VERSION | 5..4 | This has the purpose to provide forward compatibility. Current version: 0b00. |
| SYNC_ST | 3..2 | Sync Status: NO :0b00 LINK :0b01 UP :0b10 FULL :0b11 Thus, the master can indicate whether it has yet achieved partial or full synchronisation with the slave device |
| LAST_BIT | 1 | When LAST BIT is set to 1 the slave will send out a SSFCRC in the next Frame. |

-continued

| Section | Bit Slots | Description |
| --- | --- | --- |
| IGNORE | 0 | When this bit is set to 1 a slave device will ignore the remainder of the control frame, and will not send out a SSFCRC |

In standard implementations the CRC is padded with '0' bits before the actual transmission of the CRC code itself. As a consequence a remainder of the division by the CRC polynomial of a to be protected received bit sequence in concatenation with the received CRC code itself results in a remainder of all '0's when no bit errors have been introduced during the transfer of data.

By padding the CRC with a modified padding sequence this remainder will have a fixed value other than all '0's, independent of the data sequence to be protected.

By padding the CRC with a specific padding sequence the remainder can be guaranteed to be all '1's in the absence of transmission errors.

A characteristic of CRC calculation is that when an arbitrary number of errors is introduced in the transferred data sequence the calculated remainder on the receiving end can obtain each value with the same likelihood. As a consequence the impact on the robustness on the CRC calculation by allowing for a single modified padding sequence to provide a binary messaging mechanism such as associated with the transfer of interrupts only increases the probability of not detecting an erroneously received data sequence by a factor of 2. Such loss of robustness is in forthcoming scenarios acceptable.

The control frame also allows the slave, by applying the above described method of using a modified padding sequence for the calculation of the SSFCRC in the symbol slots allocated for transmitting the SSFCRC, to send an interrupt request to the master.

As mentioned above, each control frame allows the transmission of five commands, each consisting of eighteen bits. These eighteen bits consist in this example of two bits to encode four different possible commands.

In this example, the four possible commands are:

| Command | Operand | Operand From |
| --- | --- | --- |
| ADDR | 16 bit address | MA |
| RD | 16 bit data word to be read by master from slave | SL |
| WR | 16 bit data word to be written by master to slave | MA |
| CRC | 16 bit CRC over previous transfer | SL/MA |

Each command is followed by a 16-bit operand or return value. This ensures that all commands fall in an 18 bit grid. The fixed grid ensures that the slaves can always recover their position within a sequence of commands, minimizing the risk of further escalation of errors when a single bit in the command is detected incorrectly by a slave device.

Read and write transfers are formed by a concatenation of multiple commands plus operands or return values. The rules defining how specific sequences of basic commands result in various more complex transfers ignore the control frame boundary. So, for example, a command occupying two of the 18-bit slots may use two consecutive slots (for example the CMD0 and CMD1 slots) in one superframe, but could just as well use the CMD4 slot in one frame and the CMD0 slot of the subsequent frame.

Thus, commands are all issued by the master device. The default command, when the master is not actively transferring, is the CRC command. Each transfer sequence starts with an ADDR command. A second ADDR command may be used to extend a 16-bit partial address to a 32-bit full address.

One or two ADDR commands are then followed by one or more RD or WR commands. Subsequent RD or WR commands address subsequent registers (thus assuming auto incrementing). The end of a RD or WR transfer is marked by a CRC or subsequent ADDR command.

The first CRC after a WR comes from the master to protect the content of the transfer, including the address. The second CRC after a WR then comes back from the slave, to reliably confirm the reception of the data. The first CRC after a RD comes from the slave, protecting the content of the transfer.

An integrity buffer on the slave enables checking and purging/approving of write transfers before such write transfers are passed on, for instance into registers inside the slave device. The integrity buffer is only used when the slave is in integrity mode. Otherwise, register writes may be directly fed into the registers.

FIG. 8 shows the format of a command for a basic 16 bit data, basic 16 bit address write transfer, consisting of a single ADDR command followed by a WR command. The 16 bit address allows for the addressing of a subset of the devices and ports that can be addressed by a 32 bit address.

FIG. 9 shows the format of a command for a 16 bit data, full 32 bit address write transfer, consisting of two ADDR commands followed by a WR command:

FIG. 10 shows the format of a command for a 4×16 bit block, basic 16 bit address write transfer, consisting of an ADDR command followed by four WR commands. This is just an illustrative example, as any number of WR commands can follow a single ADDR command. Subsequent bytes words are stored in subsequent address locations. This auto increment function only applies to the RA section of the address, not the DA or PA.

FIG. 11 shows the format of a command for a basic 16 bit data, basic 16-bits address read transfer, consisting of an ADDR command followed by a RD command, with the data, data0, in this case being transferred from the slave to the master.

Similarly, as shown in FIG. 12, using two ADDR commands allows full 32 bit addressing.

Also, as shown in FIG. 13, multiple consecutive RD commands form a block read command.

Block writing and reading can be combined with Full 32 bit addressing, as well as with basic addressing.

The command scheme also allows for the use of robust reading and writing. A robust write transfer is identical to a non-robust write transfer, with the difference that a robust transfer is concluded by a CRC Command and a CRC from the master. A second CRC command can be given, to which the slave will respond through a CRC to acknowledge the reception of the previous robust write transfer A robust read transfer is identical to a non-robust read transfer, except for the addition of the CRC command and the following 16-bit CRC from the slave.

The robust write transfers assume the presence of an integrity buffer. During the transfer (read or write) retrieved data is written into the integrity buffer. Data is only retrieved from the integrity buffer once the integrity of the transfer has been confirmed by means of the CRC concluding the transfer. Only then it will find its way into the registers of the slave in case of a write transfer, or be accepted by the master in case of a read transfer.

Figure 14:
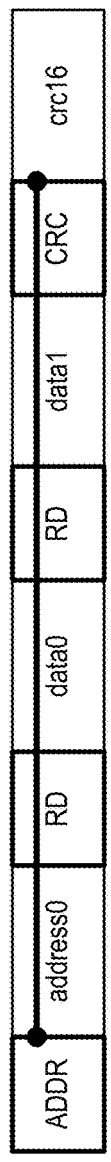

FIG. 14 shows the command sequence for a robust block read, using basic addressing, where data0, data1 and crc16 are sent from the slave to the master, and the a horizontal line with circles at each end indicates which data bits (CMD+OPERAND/RESPONSE) are covered by the respective CRC.

Figure 15:
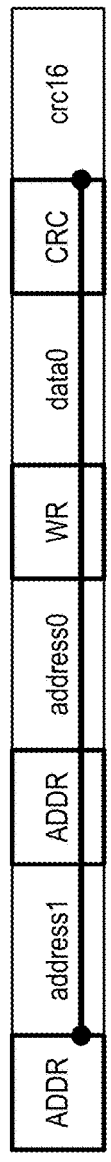

FIG. 15 shows the command sequence for a robust 1-word write, with full addressing, and therefore having two ADDR commands, one WR command, and one CRC command.

Figure 16:
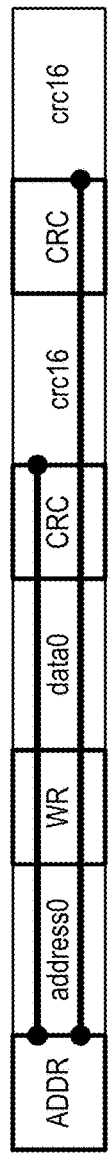

FIG. 16 shows the command sequence for a robust 1-word write, with basic addressing, and with acknowledge and therefore having one ADDR command, one WR command, and two CRC commands, with data0, and the first crc16 being sent from the master to the slave and the second crc16 being sent from the slave to the master.

Figure 17:
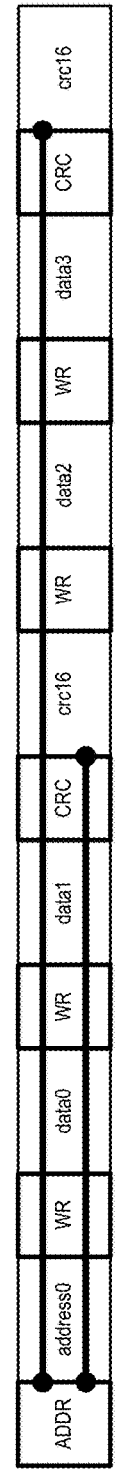

FIG. 17 shows the command sequence for a robust long block write, with basic addressing, and therefore having one ADDR command, four WR commands, and two CRC commands, with data0, data1, the first crc16, data2, data3 and the second crc16 being sent in that sequence from the master to the slave.

Figure 18:
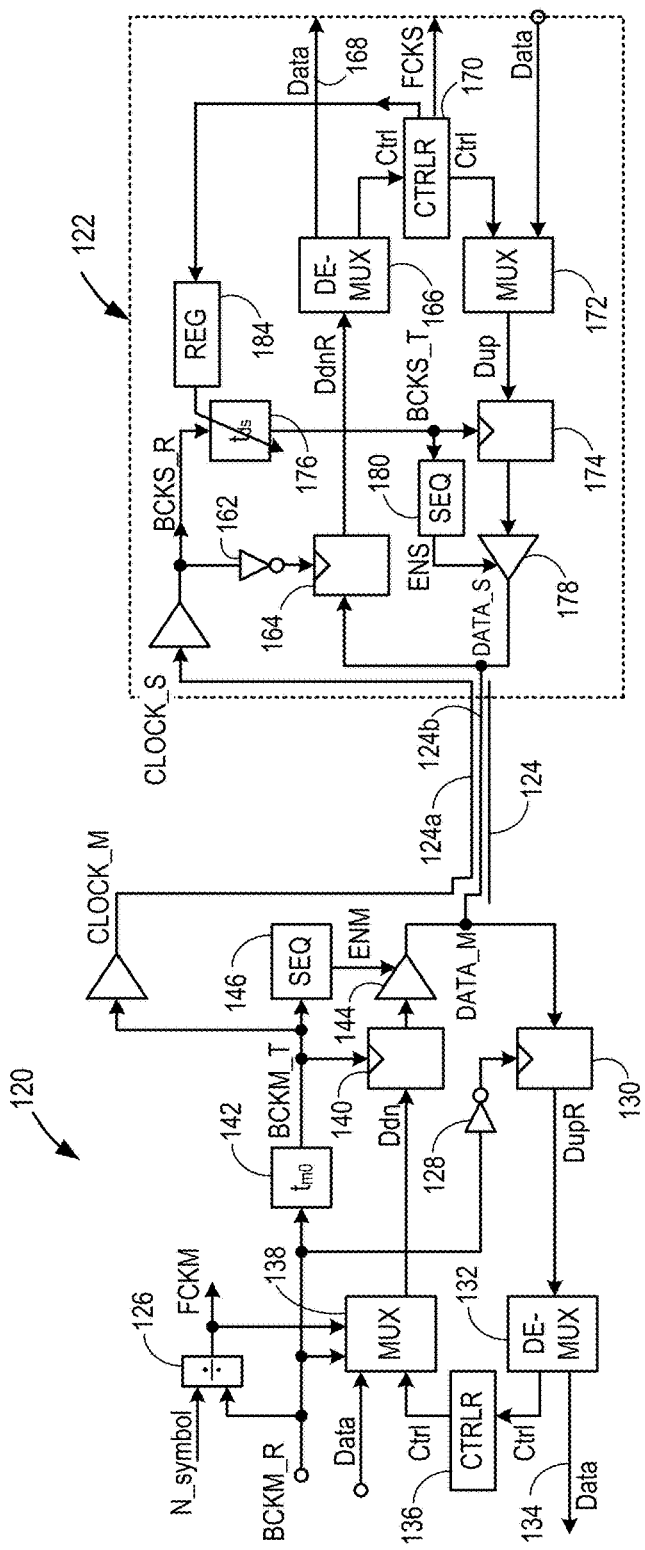
FIG. 18 illustrates first and second devices configured for operating as described herein.

FIG. 18 shows an embodiment of a system as described above, showing a master device 120 and a slave device 122, connected by a bus 124. The bus 124 is illustrated as comprising a pair of wires 124a and 124b, with one wire 124a carrying clock waveforms and the other wire 124b carrying data waveforms. Physically, each of these connections may comprise a single wire for signal transmission or a balanced pair of wires to allow differential signal transmission. The bus 124 may possibly also include other wires for power and ground connections or other signals.

In this embodiment, the timing on the master side is set by a master clock BCKM_R, at the symbol rate, and the frame clock FCKM is obtained by dividing that clock in a divider 126 by the number of symbols per frame, N_symbol. (In other embodiments FCKM may be supplied as a master clock and BCKM_R generated therefrom by a clock multiplier, or both clocks may be divided down from some higher-frequency master clock)

The phase of the BCKM_R clock corresponds to the timing at which the master device 120 expects to sample data symbols from the slave device 122. Thus, the BCKM_R clock signal is supplied through an inverter 128 to a receive block 130. In time slots where data from the slave is expected, from knowledge of which symbol slots in a frame are allocated for transmission from the slave to the master, receive block 130 receives the signal DATA_M present at the master end of the data line of the bus and extracts data DupR corresponding to data Dup transmitted from the slave. This data contains traffic data, i.e. payload data, and control data, and so the received signal is passed to a demultiplexer 132, which supplies the traffic data on an output 134, and supplies the control data to a controller 136.

When the master side is transmitting data, control data from the controller 136 is multiplexed in a multiplexer 138 with the traffic data to be transferred, and the resulting combined data Ddn is supplied to an output register 140. The BCKM_R clock is passed through a delay block 142 to generate clock pulses BCKM_T whose phase corresponds to the timing at which the master device 120 intends to transmit data symbols. The BCKM_T clock signal is then used to latch the output data from the output flip-flop 140 to a buffer 144. The buffer 144 is controlled by a sequencing block 146, which, with knowledge of which symbol slots in a frame are allocated for transmission from the master to the slave, enables data to be passed through the buffer 144 during the correct time slots onto a wire 124*b* of the bus 124 as a signal DATA_M. The BCKM_T clock signal is also passed to buffer 148 which places the buffered clock signal CLOCK_M onto the wire 124*a* at the master end of bus 124

The clock signal propagates down the bus and arrives at the slave end as delayed clock signal CLOCK_S which is then buffered in a buffer 150 to drive the slave circuitry as clock signal BCKS_R.

The data signal also propagates down the respective wire and arrives at the slave as delayed data signal DATA_S. Assuming that the delay down each wire of the bus is the same, which is a good approximation in practice, the edges of this data signal DATA_S will have been delayed by the same amount as the edges of the clock CLOCK_S. For best data recovery despite any degradation of the signals down the bus, it may be best to sample the data at the opposite edge of the clock.

Thus, the clock BCKS_R is supplied through an inverter 162 to a receive block 164. In time slots where data from the master is expected, based on knowledge of which symbol slots in a frame are allocated for transmission from the master to the slave, receive block 130 receives the signal DATA_S present at the slave end of the data line of the bus and extracts from it received data DdnR corresponding to the data Ddn transmitted from the master. This data contains traffic data and control data, and so the received signal is passed to a demultiplexer 166, which supplies the traffic data on an output 168, and supplies the control data to a controller 170. The control data may contain patterns to allow synchronisation of the start of frames and superframes, which is used by circuitry in the controller 170 to derive appropriate slave frame clock FCKS. This avoids the need for a further wire between master and slave to carry a frame clock signal.

When the slave side is transmitting data, control data from the controller 170 is multiplexed in a multiplexer 172 with the traffic data to be transferred, and the resulting data Dup is supplied to an output register 174. The BCKS_R clock is passed through a controllable delay block 176 to generate clock pulses BCKS_T whose phase corresponds to the timing at which the slave device 122 intends to transmit data symbols. The BCKS_T clock signal is then used to latch the output data from the output register 174 to a buffer 178. The buffer 178 is controlled by a sequencing block 180, which, with knowledge of which symbol slots in a frame are allocated for transmission from the slave to the master, enables data to be passed through the buffer 178 onto data line 124*b* as a physical signal DATA_S during the correct time slots.

As described in more detail below, the delay applied by the controllable delay block 176 is determined by a delay value that is stored in a register 184. The delay value stored in the register 184 can be updated based on timing control data that forms part of the control data transmitted by the master device 120 to the slave device 122 and extracted by the controller 170 from the received signal DdnR.

The controllable delay block 176 can for example take the form of a delay line, comprising multiple inverters, each delaying the signal by a time of the order of nanoseconds, such that the total delay applied by the controllable delay block 176 depends on the number of such elements that is switched into the signal path.

Thus, the operational mode of the system is described above. Before entering the operational mode, there is a calibration and synchronisation phase, which establishes the connection between the master and the slave.

In this embodiment, the calibration and synchronisation phase contains five subphases, although it will be appreciated that any of these sub-phases can be performed separately from the others, or the sub-phases may be performed in a different order.

Figure 19:
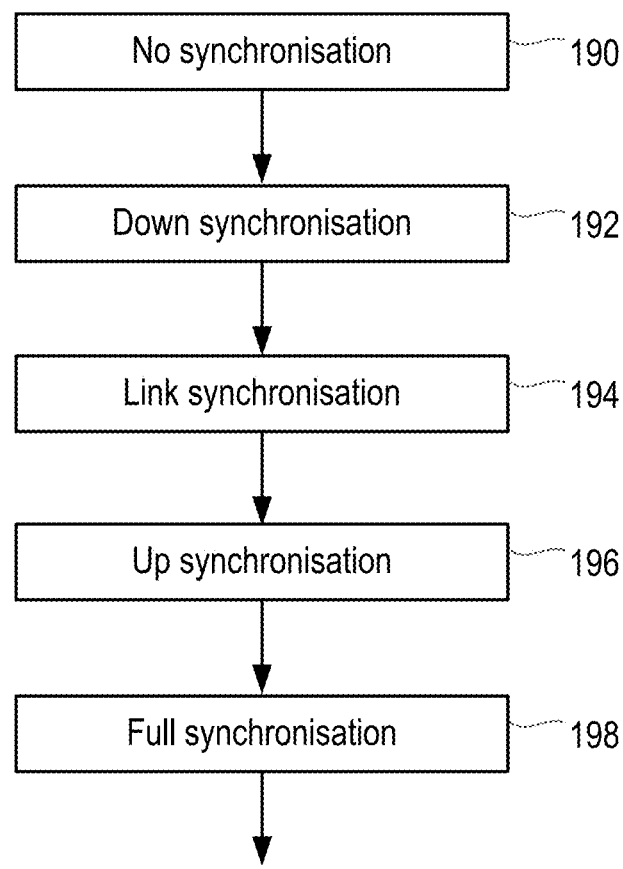
FIG. 19 is a flow chart, illustrating a method of calibration and synchronisation.

FIG. 19 is a flow chart, illustrating the calibration and synchronisation phase of one particular embodiment.

Specifically, FIG. 19 shows an initial step, which takes place on system start-up, power-up, or reset, or at a later time, when it is detected that an accessory jack has been inserted into the socket of the master device, or at a time when the system is already powered up with a jack inserted and an audio application is first started. At this stage, there is a clock signal provided from the master device but there is no frame synchronisation between the master portable communications device and the audio accessory. In step 190, the master device sends data symbols on the data line to the slave device, allowing the slave to establish initial frame synchronisation.

In step 192, down synchronisation takes place, in which the slave sends symbols to the master device, allowing the master to enter a synchronised state. The master is then capable of sending control data to the slave, for instance to alter the length of the frame from an initial default value or to communicate other operational parameters.

In step 194, the slave re-acquires frame lock according to any revised operational parameters.

In step 196, the slave may then send synchronisation symbols to the master, which uses the received synchronisation symbols to determine the timings of the received symbols relative to the timings of its own transmissions. The master device then sends timing delay control data based on that determination, in an iterative procedure until the timing reaches a desired value. The slave device then stores a delay value based on that timing delay control data.

In step 198, the master and the slave devices reach full synchronisation.

Figure 20:
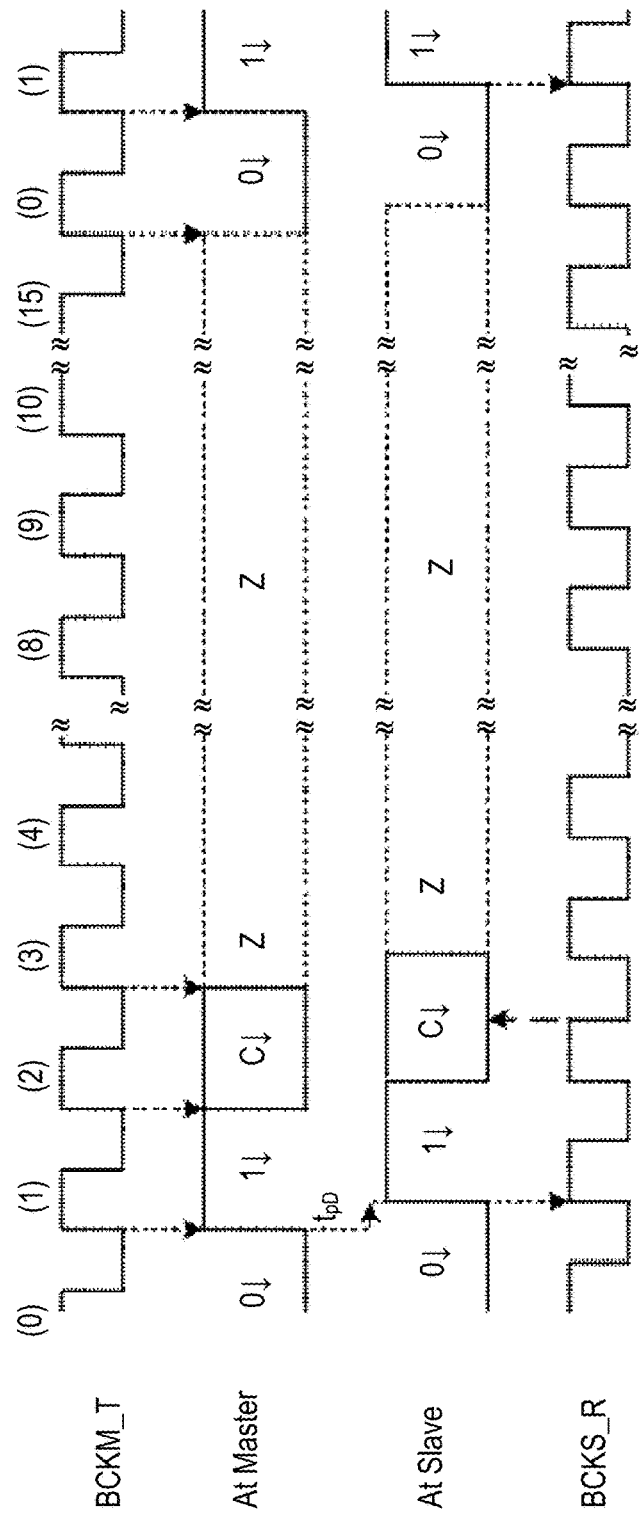
FIG. 20 is a timing diagram, illustrating signals transmitted between the first and second devices at a first stage of the method of FIG. 19.

FIG. 20 is a timing diagram, showing in more detail the symbols sent between the master device and the slave device in step 190 of the process shown in FIG. 19 for an embodiment.

When it is powered up, the master device is generating a master transmission clock signal BCKM_T, which it uses for timing its transmissions. Specifically, at this time, the master device sends out a basic pattern that can be used by the slave device to establish frame timing information. Thus, the master device sends a synchronisation data pattern that consists of a 0 (shown as 0↓ in FIG. 20) and a 1 (shown as 1↓ in FIG. 20) in a pair of consecutive bit slots of each frame.

In the first 16 frames of each repeating superframe of 128 frames, in the bit slot following the synchronisation data pattern, the master device sends a control bit (shown as C↓ in FIG. 20). In the period of each frame following the control bit, each device enters a high impedance state Z, during which there is no observable effect at that device of either device driving data onto the wire.

The slave device contains circuitry (for example the controller 170 shown in FIG. 18) for recovering a local slave frame clock FCKS based on the timing of the 0 to the 1 transition that occurs in each frame.

Once the slave frame clock FCKS has been established, a clock edge that is one and a half symbol periods later than the 0 to the 1 transition in the synchronisation data pattern is used to sample the control bits in the frames in which they occur. The presence of these control bits in the first 16 frames of each superframe, as described above, is then used by the slave device to identify the start of the superframe.

Once the slave device recognises this, it enters a down synchronisation state.

Figure 21:
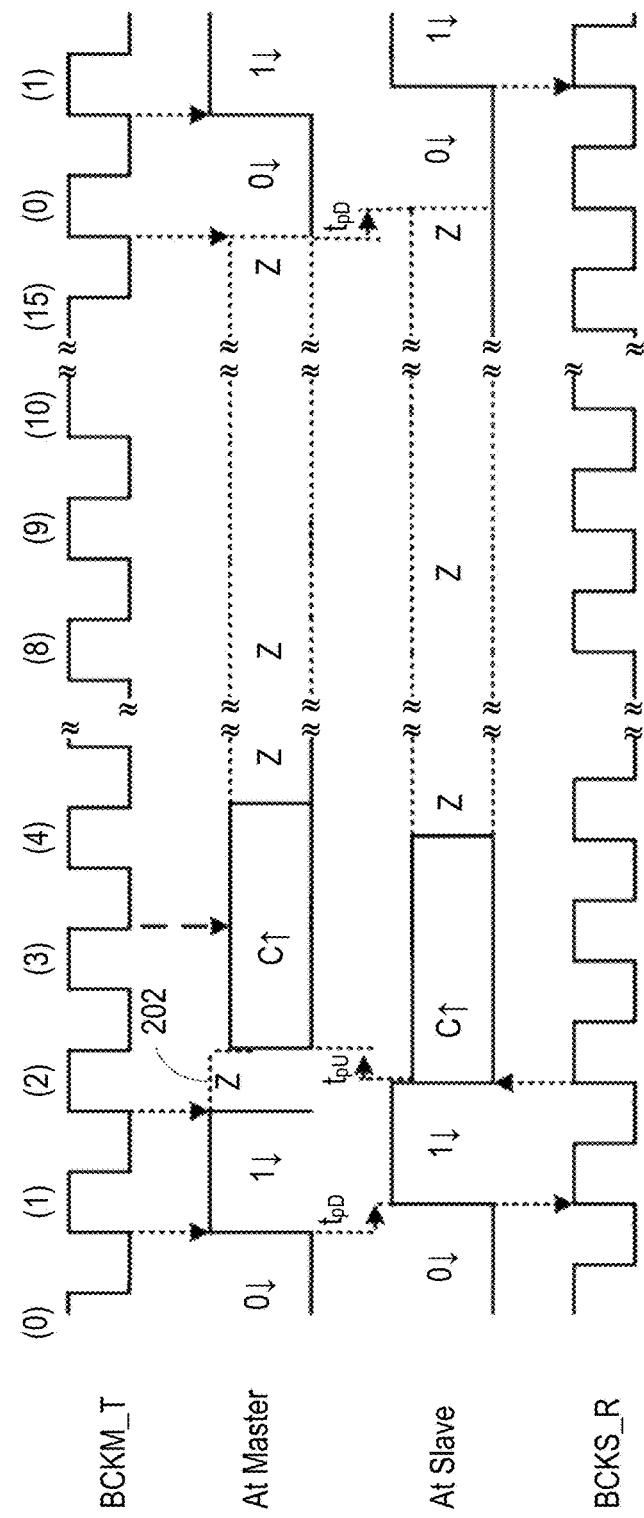
FIG. 21 is a timing diagram, illustrating signals transmitted between the first and second devices at a second stage of the method of FIG. 19.

FIG. 21 is a timing diagram, showing in more detail the symbols sent between the master device and the slave device in step 192 of the process shown in FIG. 19.

Specifically, FIG. 21 shows the situation in a part of the control frame that is outside the first 16 frames of the superframe, as this latter period is being used for the master device to send a superframe synchronisation control word as described above.

The master device is continuing to send out the basic frame synchronisation data pattern consisting of a 0 (shown as 0↓ in FIG. 21) and a 1 (shown as 1↓ in FIG. 21) in consecutive bit slots of each frame, as so far it has not received any notification from the slave that the slave has actually synchronised.

As mentioned with reference to FIG. 20, the symbols of the synchronisation data pattern transmitted by the master device are received by the slave device after a transmission delay of $t_{pD}$.

Immediately after receiving the symbols of the synchronisation data pattern, the slave device sends a control symbol (shown as C↑ in FIG. 21), which is double the normal length, that is, it occupies two clock periods of the slave reception clock BCKS_R. This double length symbol allows the master device to sample the received symbol at a point that is well separated from a bit transition, even though the timing of the received signal will be unknown to the master device at that time.

The control symbols C↑ transmitted by the slave device over multiple frames form a control sequence.

FIG. 21 shows the double length symbol C↑ transmitted by the slave device to be received by the master device after a transmission delay of $t_{pU}$. Thus there is a total gap, shown by the reference numeral 202, equal to $t_{pD}$ plus $t_{pU}$ between the time at which the master device completes sending the synchronisation data pattern and the time at which it starts receiving the control symbols C↑ transmitted by the slave device.

During the delay 202, the master device enters a high impedance state Z, during which there is no observable effect at the master device of either device driving data onto the wire.

The control symbols transmitted by the slave device contain some information that confirms that the slave device is a valid slave, operating in accordance with the expected protocol.

On receipt of a valid control sequence, the master device enters the down synchronised state.

One this state has been established, the master device is able to send control data to the slave device in order to program the desired value of N_Symbol into registers in the slave. Once the slave has confirmed (by sending suitable control bits) that this control data has been received, the master instructs the slave to start using the programmed value of N_Symbol instead of its previous default value (for example, 16).

In step 194 of the process shown in FIG. 19, once the slave device has stored the desired value of N_Symbol, it is able to re-acquire the suitable frame lock, to achieve link synchronisation.

Once the slave confirms this, and the master has verified it, the master device enters the up synchronised state.

Figure 22:
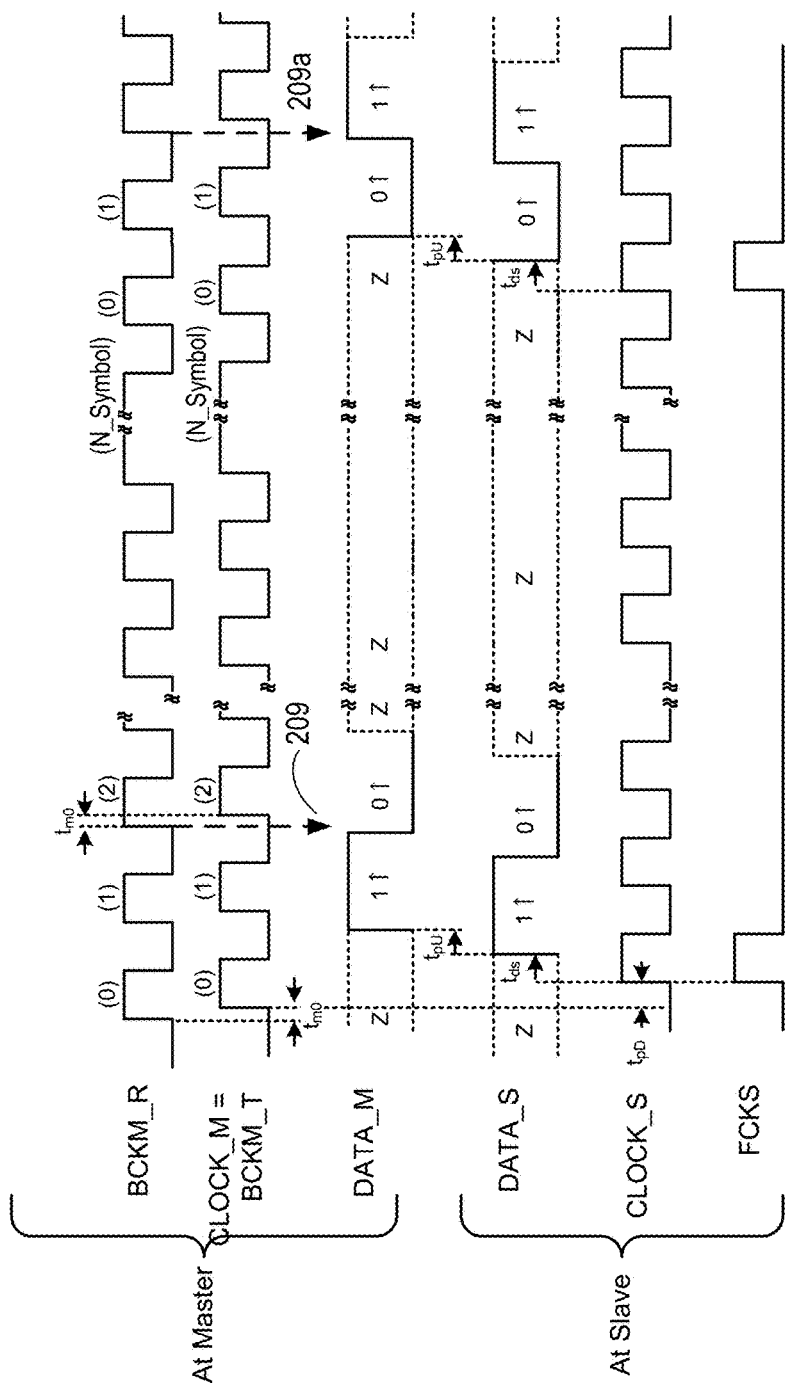
FIG. 22 is a timing diagram, illustrating signals transmitted between the first and second devices at a third stage of the method of FIG. 19.

FIG. 22 is a timing diagram, showing in more detail the symbols sent between the master device and the slave device in step 196 of the process shown in FIG. 19.

The master communicates to the slave device that it is in the up synchronisation state. In this stage, as shown in FIG. 22, the master device no longer needs to send out the frame synchronisation data pattern since the slave has now synchronised on both a frame and superframe basis to the desired value of N_symbol.

As mentioned with reference to FIG. 20, the clock CLOCK_M as transmitted by the master device, is received by the slave device as clock CLOCK_S after a transmission delay of $t_{pD}$.

The slave device then starts sending out its own synchronisation data pattern comprising two symbols of opposite polarity. As shown in FIG. 22, the synchronisation data pattern transmitted by the slave device comprises a 1 (shown as 1↑ in FIG. 22) followed by 0 (shown as 0↑ in FIG. 22). (The synchronisation data pattern transmitted by the slave device may alternatively comprise a 0 followed by a 1 with appropriate adjustments to following logic.)

As shown in FIG. 22, the slave device does not send its synchronisation data pattern aligned directly to the received clock CLCK_S, as it did with the control symbol in FIG. 21, but rather it inserts an extra delay $t_{ds}$ between the edges of the clock CLCK_S it receives and the edges of the synchronisation data pattern it transmits. This extra delay $t_{ds}$ may for example initially be set by storing in the register 184 (shown in FIG. 18) an initial delay value of half of one symbol period.

Figure 23:
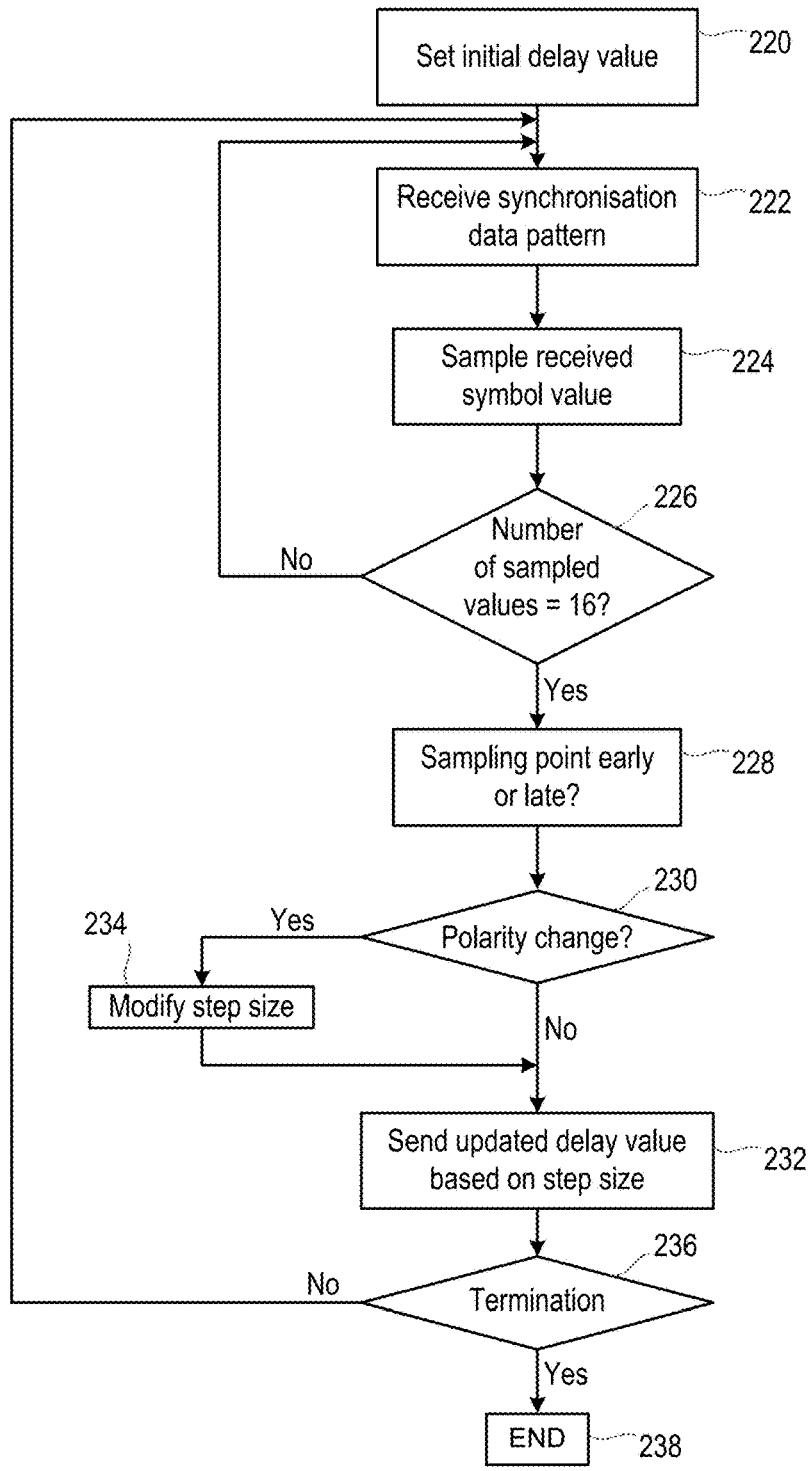
FIG. 23 is a flow chart, illustrating an aspect of the method of calibration and synchronisation.

FIG. 23 is a flow chart, showing how the master device uses the synchronisation data pattern that it receives from the slave device.

In step 220, an initial value is set for the extra delay $t_{ds}$, and is stored in the register 184 in the slave device.

In step 222, the master device receives the synchronisation data pattern in one frame. In one embodiment, the synchronisation data pattern is transmitted by the slave device for 16 consecutive frames.

In normal operation mode, when the calibration and synchronisation is complete, falling edges (say) of the master reception clock signal BCKM_R are used to sample signals received from the slave device, and it is advantageous to do this sampling at a point that is far from the symbol transition point (i.e. in the middle of the received pulses). In step 224, however, the opposite edges of the master reception clock signal BCKM_R are used to sample the received synchronisation data pattern. The intention here is to sample the received synchronisation data pattern at time points that are as close as possible to the symbol transitions.

As explained in more detail below, in normal operation, it is preferable for the symbol transitions of the signals received by the master device to be close to the symbol transitions of the signals transmitted by the master device, but with a sufficient margin $t_m$ to ensure that a symbol received from the slave is completed before the start of transmission of a symbol from the master. Thus BCKM_R may be established with a deliberate advance in time $t_{m0}$ before BCKM_T. This sampling is illustrated by arrow 209 in FIG. 22.

In step 226, it is determined whether 16 consecutive frames of the synchronisation data pattern have been received. If not, the process returns to step 222. When 16 consecutive frames of the synchronisation data pattern have been received, the process passes to step 228, in which the sample values obtained during the 16 frames are examined.

As mentioned above, the delay value set in the slave device, namely $t_{ds}$, is set at the start of the process to an initial value, which may for example be a half of one symbol period. If the transmission delays ($t_{pD}$ and $t_{pU}$) total an additional delay of one half of one symbol period delay, the total round-trip delay $t_{dRT}=t_{pD}+t_{pU}+t_{ds}=$one bit period.

If this could be achieved with perfect reliability in the operational mode, then the master device would start transmission of its data symbols immediately after completing receiving data symbols from the slave device. However, various factors mean that this cannot be guaranteed. For example, the effects of clock jitter and noise mean that the timings of the symbol edges will fluctuate slightly. In addition, the timings may drift due to changes in temperature, physical deformation, or the like. Therefore, it may be preferable for there to be a small margin between the master device completing receiving data symbols from the slave device and starting transmission of its data symbols.

This process therefore aims to control the delay value set in the slave device, namely $t_{ds}$, so that the total round-trip delay ($t_{dRT}=t_{pD}+t_{pU}+t_{ds}$) plus this margin ($t_m$) equals one bit period.

Therefore, in step 224, the master device samples the received synchronisation data pattern at a time point that is $t_{m0}$ before the point at which the master would start to transmit symbols, as governed by the master transmission clock.

If the total round trip delay $t_{dRT}$ is smaller than anticipated, then the master will sample late, that is, after the transition point in the slave synchronisation data pattern, as illustrated at sampling point 209 in FIG. 22. Since this transition is from 1 to 0, the sample value obtained by the master will probably be a 0. If the total round trip delay $t_{dRT}$ is larger than anticipated, then the master will sample early, and the sample value obtained by the master will probably be a 1.

If the total round trip delay $t_{dRT}$ is exactly as anticipated, then the master will sample exactly on the transition point, and the sample value is equally likely to be a 0 or a 1.

In more detail, the transition of the physical signal is likely to have a non-zero fall time. The interpretation of whether the physical signal represents a logic 1 or 0 may involve a comparison at the sampling time of the signal level against a nominal logic threshold value. When optimally aligned the value of the signal level at the sampling point would be expected to be exactly equal to the nominal logic threshold value. Noise and similar effects would result in interpretation of a logic 1 or 0 at each sample point, each being equally likely. Thus the sampled logic level is equally likely to be a 0 or a 1, as interpreted by comparison of the sampled physical signal level relative to the expected level.

In step 228, the master device considers the sample values obtained from sampling the slave synchronisation data patterns in the block of 16 frames, and compares the numbers of 1's and 0's. If the majority of sample values are 0's it is determined that the master was sampling late; if the majority of sample values are 1's it is determined that the master was sampling early; and, if the proportions of 1's and 0's are close to 50% each, it is determined that the sampling point was approximately as intended.

In step 230, it is determined whether the error in the sampling point has changed polarity since the previous iteration, that is whether the master has changed from sampling early to sampling late, or vice versa. If not, that is, if the polarity of the error is the same as in the previous iteration, the process passes to step 232.

In step 232, the master sends updated delay value information to the slave device. This delay value information causes the slave device to alter the extra delay value $t_{ds}$ by a predetermined step size.

If it is determined in step 230 that the error in the sampling point has changed polarity since the previous iteration, that is the master has changed from sampling early to sampling late, or vice versa, the process passes to step 234. In step 234, the predetermined step size mentioned above is modified from its previous value. For example, in one embodiment, the step size is halved in step 234. The process passes to step 232 as before.

The process then passes to step 236, in which it is determined if a termination condition has been met. If not, the process returns to step 222 but, if the termination condition has been met, the process passes to step 238, and ends. Thus, the process iterates until the termination condition is met. For example, the termination condition may require that the delay value has converged to a value of $t_{ds}$ which is judged satisfactory, or may set a predetermined maximum number of iterations of the process, or may consider whether a predetermined minimum value of the step size has been reached by repeated operation of step 234.

Thus the process converges to a delay value set in the slave device, namely $t_{ds}$, such that the total round-trip delay ($t_{dRT}=t_{pD}+t_{pU}+t_{ds}$) plus the introduced margin ($t_{m0}$) equals one bit period, in this example as explained so far, for a propagation delay $t_{pU}$ experienced by a 1 to 0 transition in data transmitted from slave to master. In use, there may obviously be transitions from 0 to 1 in the transmitted data transmitted from slave to master. For embodiments in which the signals are transmitted differentially, by symmetry there may be little difference in propagation time. However where the data is transmitted as a single physical signal there may be significant differences between rising and falling edge propagation times.

Thus, as illustrated at the sampling point 209a in FIG. 22, the data transmitted in step 224 may also comprise symbol pairs including a 0 to 1 transition. The 16 symbol pairs transmitted may comprise an equal number of each type. At step 228 the early-late indication is interpreted according to whether the expected transition was 0 to 1 or 1 to 0. For example a sampled 1 would indicate an early arrival of data in the case of an expected 0 to 1 transition, but late arrival of data in the case of an expected 1 to 0 transition. The number of late versus early indications is then compared in order to decide whether to increase or decrease the applied delay. The pattern of 0 to 1 and 1 to 0 transitions may be determined in advance, say either eight of the former followed by eight of the latter, or alternate transitions, or some other pattern. It may be the same for each iteration or vary in some predetermined sequence though successive iterations.

Figure 24:
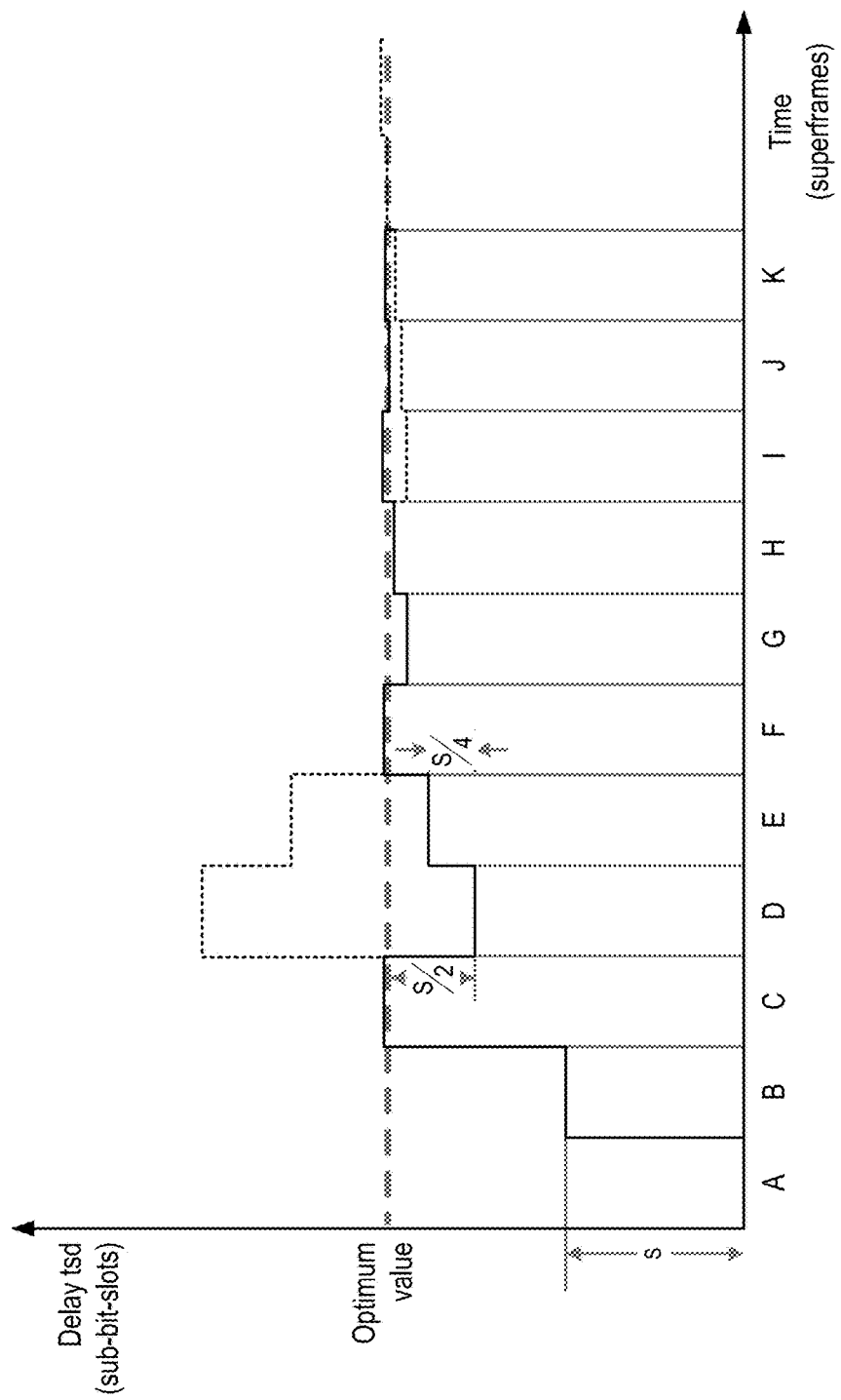
FIG. 24 illustrates the method of FIG. 23.

FIG. 24 illustrates one operation of the method, by showing the delay value that is applied in different iterations A, B, C, . . . of the process, with the optimum value being the delay value that causes the master to sample exactly at the transition point in the slave synchronisation data pattern and that (due to the effects of jitter and noise) is equally likely to produce a majority of sample values that are 0's as it is to produce a majority of sample values that are 1's. The optimum value is indicated by a dashed line in FIG. 24.

Thus, in a first iteration A, the delay value is found to be too small, and so timing control data is sent to the slave, causing the delay to be increased by a step S. In iteration B, the delay value is again found to be too small, and so timing control data is again sent to the slave, causing the delay to be increased by a further step S.

As shown, in the iteration C, the delay value is now found to be slightly too large, and so timing control data is sent to the slave. As the polarity of the difference has changed, the step size is halved, and so the new timing control data causes the delay to be reduced by a step S/2.

In the next iteration D, the delay value is again found to be too small. As the polarity of the difference has changed again, the step size is halved again, and so the new timing control data causes the delay to be increased by a step S/4. In iteration E, the delay value is again found to be too small, and so timing control data is again sent to the slave, causing the delay to be increased by a further step S/4.

As a result, in the iteration F, the delay value is found to be slightly too large. As the polarity of the difference has changed again, the step size is again halved, and so the new timing control data causes the delay to be reduced by a step S/8.

Thus, the process continues, and it can be seen that the delay value converges towards the optimum value.

It can also be seen that the effect of halving the step size only in the event of a polarity change helps with the convergence. For example, in this illustration, the delay value was found to be slightly too large in the iteration C. However, if, instead, the delay value had been found to be slightly too small then, as shown by the dotted line, the timing control data sent to the slave would have caused the delay to be increased by a further step S. Then, the delay value would have been found in step D to be too large, and so timing control data sent to the slave would have caused the delay to be reduced by a step S/2 (with the step size having been halved). Next, the delay value would again have been found in step E to be too large, and so timing control data sent to the slave would have caused the delay to be reduced by a further step S/2, thus returning to the same point in step F as was actually found to be the case. Thus, the algorithm is robust against discrepancies caused by jitter, noise, or the like.

This method can be performed using the control words that are available, as described above. Thus, FIG. 7 shows the 128 bits forming one control frame, with one control bit being present in each frame of the superframe. As shown in FIG. 7, the control frame includes five control words, that can be used to transmit control data from the master to the slave, or from the slave to the master.

In one embodiment, the method described here is iterated once in each superframe, as shown in FIG. 24. Each iteration requires four control words out of the five available in each superframe. (As described below, the superframe rate may, for example, be 12 kHz.)

For example, the first four control words CMD0-CMD3 in each superframe can be allocated as follows:
CMD0: Master transmits slave address to write updated delay into CMD1: Master transmits Updated delay value.
CMD2: Slave transmits Dummy address Zero
CMD3: Slave transmits test pattern with updated delay, to be read by master.

In the physical embodiment illustrated in FIG. 18, these control words are received as a physical signal by the receive block 164, where the signal is sampled at an edge of an appropriate version of the receive clock BCKS_R to provide a data stream DdnR, from which the controller 170 extracts the control words CMD0 and CMD1, and writes a delay value to the register 184. This stored delay value is then used by the delay block 176 to provide a suitable clock with which to transmit the control words CMD2 and CMD3 in control frame slots defined in the sequencer 180 as physical signals driven by the buffer 178.

On arrival at the master device, the physical signal is sampled by the receive block or sampling circuit 130 at an edge of a version of local clock BCKM_R to generate the data stream DupR. The late or early arrival of the physical signal may be determined or deduced by the controller 136, for example from the relative numbers of 0's and 1's in some period, from which the controller 136 may generate an updated delay value, i.e. timing data control data, for example by the method above. This timing delay control data is transmitted as part of the physical signal transmitted by the buffer 144 in the appropriate symbol slot as determined by the sequencer 146 with symbol boundaries synchronised to the transmit side version BCKM_T of the local clock BCKM_R.

In some embodiments, the timing delay control data transmitted from the master to slave may directly represent the delay to be applied within the slave. In other words, the controller 136 in the master may calculate delay value data to be stored in the slave register 184 to be directly applied to delay block 176. When this delay value data is received by the slave, the slave controller 170 may merely forward this delay value data unchanged to register 184, save for any necessary consistent data format or polarity or scaling operation.

In other embodiments, the timing delay control data generated and transmitted by the master may comprise merely an indication of the step size and polarity by which the applied delay needs to be increased or decreased, and the controller 170 in the slave may implement the necessary addition or subtraction.

In other embodiments, the timing delay control data generated and transmitted by the master may comprise merely an indication of whether the delay needs to be increased or decreased, and the controller 170 in the slave may implement a step size and polarity control algorithm (for example as described above) to provide a calculated revised value to register 184.

In still further embodiments, the control data transmitted by the master may simply indicate the timing of the transitions that it receives, and the slave controller may determine what delay should be applied based on this timing information.

In all cases however the applied delay is based on the transmitted timing delay control data.

Figure 25:
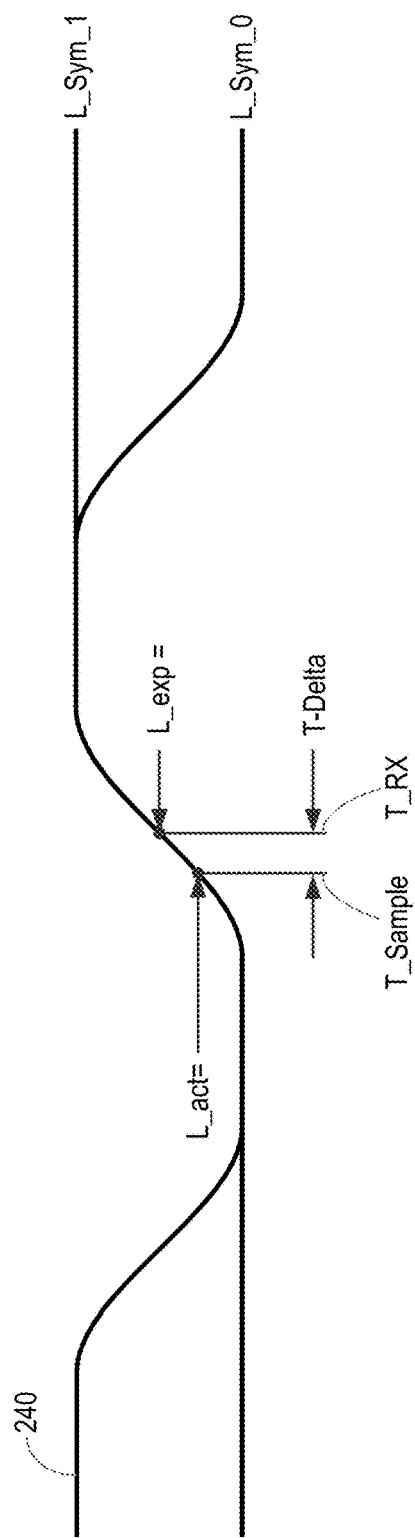
FIG. 25 is a timing diagram, illustrating a signal received by a master device.

FIG. 25 illustrates an alternative method of adjusting the delay value that is signalled from the master device to the slave device, in order that the signals from the slave device are received at the master device at the intended time when this delay is applied by the slave.

As described with reference to FIG. 23, the slave device sends a slave synchronisation data pattern to the master device. FIG. 24 shows an example where the synchronisation data pattern is made up of logical 0's and 1's, and the signal level varies between the relevant levels. This method takes advantage of the fact that, in practice, the actual signal level does not change instantaneously from the logical 0 level to the logical 1 level, or vice versa. Thus, the master device samples the incoming signal sequence at some timing and aims to determine a measure for the difference in timing, T_Delta, between the sampling point T_Sample and the timing of the received signal transition, T_RX (that is, the midway point in the transition from the logical 0 level to the logical 1 level). It does this by using the actual sampled signal level in the range from 0 to 1. In this illustrated example, the sampling point occurs during a signal transition from the logical 0 level (L_Sym_0) to the logical 1 level (L_Sym_1). One advantage of using differential transmission over a balanced pair of wires is that the midway point in the transition from the logical 0 level to the logical 1 level is at zero volts.

It is assumed that, through some a priori knowledge, resulting from some preceding synchronisation mechanism, the timing of the transition is known to within +/−½ symbol period. FIG. 24 then shows actual sampled received signal level L_act being acquired at the sampling time T_Sample.

The timing of the received signal transition is defined by the moment at which the received signal crosses an expected signal level, L_exp, where said expected signal level is the average of the expected signal level during the first symbol of the two symbols forming the sync sequence, L_Sym_0 and the expected signal level during the second symbol of the sync sequence, L_Sym_1.

A simple measure for the difference in time can be derived from $$T\_Delta\_Estimate\_Generic = Cs * Symbol\_Period * (L\_exp - L\_act)/(L\_Sym\_1 - L\_Sym\_0).$$

In this equation, Cs*Symbol_Period is the fraction of a symbol period over which the signal level transitions from the logical 0 level to the logical 1 level, and it can be assumed that Cs is constant. In addition, L_Sym_1 and L_Sym_0 are constant values, and estimates for both are known at the master device. As such, the combination of multiplication by (Cs*Symbol_Period) and division by (L_Sym_1−L_Sym_0) can be regarded as a multiplication operation by some constant C:

$$T\_Delta\_Estimate\_Generic = C*(L\_exp - L\_act)$$

In an actual implementation, sampled signal values are typically quantized with finite resolution as part of the sampling process and mapped on a finite set of discrete levels. Even when the quantization process only discerns as few as two discrete levels, each discrete level can be mapped backwards on an input signal level which represents the average signal level at the input of the sampler for all cases in which the sampled and quantized signal equals said discrete signal level.

Based on such inverse mapping operation an estimate for L_act, namely L_act_est, can at any moment be derived from any sampled and quantized signal value, sampled at T_sample.

Without changing the essence of said procedure, a measure for T_Delta can be formulated as:

$$T\_Delta\_Estimate\_Generic = C*(L\_exp\ L\_act\_est)$$

In practice, it is useful to sample the received signal multiple times, during different frames, in order to obtain multiple samples of the received signal, and these can be used to produce a more accurate value for L_act_est, mitigating the effect that noise may have on the timing or the level of the sampled signal. In general, this more accurate value can be obtained by calculating an average value L_act_est_Ave, of L_act_est by calculating the sum of N values of L_act_est and dividing that sum by N.

In a specific case in which the receiver maps the incoming received signal on logic 0 and 1, in which the first symbol of the synchronisation sequence corresponds to a logic 0 and the second symbol to a logic 1, a practical implementation may average 16 samples to obtain a single measure for T_Delta.

The average can be obtained by counting the number of logic 1s in a set of 16 samples $L\_act_0, \ldots, L\_act_{15}$ to obtain a value Count1s, and dividing this number by 8.

In this case L_exp=0.5 and (L_Sym_1−L_Sym_0)=1.

As a consequence, the estimate for the time difference can be obtained as.

$$T\_Delta\_Estimate\_0\_1 = C*(0.5 - Count1s/16)$$

A further simplification can be obtained by some further scaling of the constant, C, effectively dividing it by 16.

$$T\_Delta\_Estimate\_0\_1 = C_{16}(8 - Count1s).$$

More generally, it is determined whether the timings of the signal level transitions as received at the master device are early or late relative to the desired timing by comparing a signal level at the desired timing with an expected signal level at the desired timing.

As shown in the example given in FIG. 24, the resulting estimate can be used to adjust the delay control data to either advance or retard the transmission of the symbols from the slave, and hence alter the timing of the transitions as detected by the master in the next iteration. The step size of such adjustments can be changed as described with reference to FIG. 24, or kept constant, or changed in any other way, in order to achieve the required combination of the speed with which the timing converges to the desired value and the precision of the convergence.

In cases where the sampled signal values are measured using a quantization process with more than two discrete levels, the resulting estimate can for example be used to adjust the delay control data to either advance or retard the transmission of the symbols from the slave by an amount that is proportional to the difference in the timing of the transitions from the desired timing.

A physical embodiment may be similar to that discussed with respect to FIG. 18. In a calibration mode, the sampling circuit 130 may generate multi-bit representations of the sampled signal and transmit these directly to the controller 136 via an additional signal path (not illustrated in FIG. 18).

After the master device has transmitted the timing delay control data to the slave (accessory), and the accessory has received the timing delay control data and updated its stored delay value accordingly, and after this process has iterated until a desired termination criterion is achieved, the master and slave enter a full synchronisation state as shown in step 198 of FIG. 19.

The master can now send to the slave details of the numbers of symbol slots allocated for transmission of payload data from the master to the slave (Nd) and from the slave to the master (Nu), if these have not previously been sent, data can then start being sent. Thus, the master device and the slave accessory enter the full operational mode, as illustrated in FIGS. 5 and 6.

Figure 26:
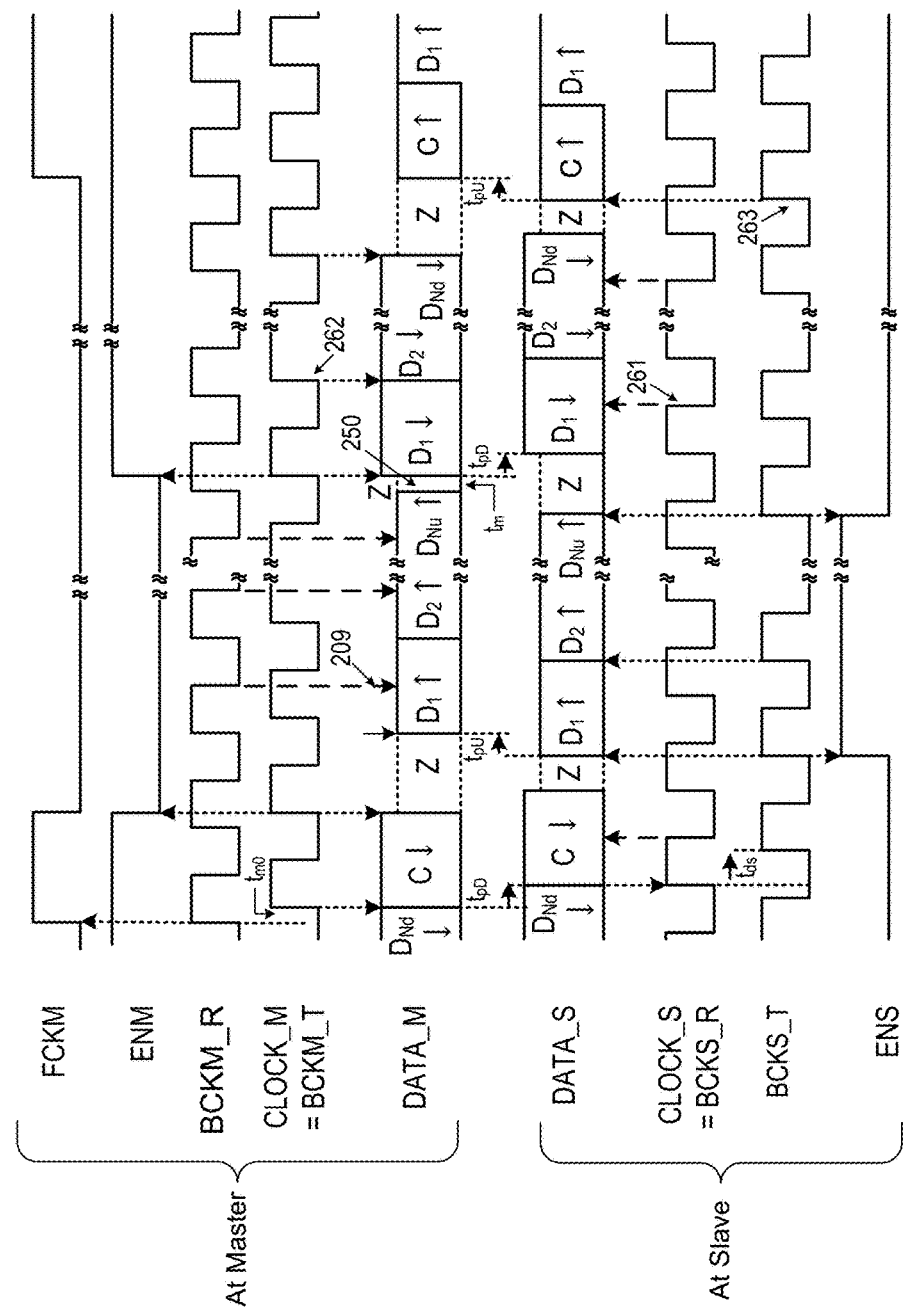
FIG. 26 is a timing diagram, illustrating signals transmitted between the first and second devices at a fourth stage of the method of FIG. 19.

FIG. 26 is a timing diagram, showing in more detail the symbols sent between the master device and the slave device in the full synchronisation state. In this illustrated frame, the control bit (shown as C↓ in FIG. 26) is being sent from the master device to the slave device. FIG. 26 can be read in conjunction with FIG. 18, which shows the generation of the relevant signals.

Thus, FIG. 26 shows:

i) the frame clock FCKM present in the master device, with one pulse in each frame: there may be only one edge of this waveform actually used, so this clock may be 50%:50% duty cycle or a single symbol period or some other value as shown;

ii) the ENM signal, for enabling the master device to transmit the downlink payload data, and (in this frame) a control bit C↓, to the slave device;

iii) the master reception clock BCKM_R, edges of which are used to time the sampling 209 at the master of symbols transmitted to the master from the slave (for example as shown in symbols $D_1 \uparrow$ and $D_2 \uparrow$ in DATA_M n FIG. 26);

iv) the master transmission clock BCKM_T, edges 262 of which are used to time the generation of symbols for transmission from the master to the slave, (for example as shown in symbols $D_1 \downarrow$ and $D_2 \downarrow$ in DATA_M);

v) the timing of data signals at each end of the bus, as DATA_M and DATA_S, namely, the control bits $C \downarrow$, $C \uparrow$, the uplink payload data symbols $D_1 \uparrow \ldots D_{Nu} \uparrow$, and the downlink payload data symbols $D_1 \downarrow \ldots D_{Nd} \downarrow$;

vi) the slave reception clock BCKS_R, edges 261 of which are used to time the sampling of symbols transmitted to the slave from the master (as shown in symbols $D_1 \downarrow$ and $D_{Nd} \downarrow$;

vii) the slave transmission clock BCKS_T, edges 263 of which are used to time the generation of symbols for transmission from the slave to the master; and viii) the ENS signal, for enabling the slave device to transmit the uplink payload data.

In this example, the delay $t_{ds}$ configured by the master device in the slave device is such that the total round trip delay from the master to the slave slightly less than one symbol period. The total round trip delay is given by:

$$tdRT = tpD + tpU + tds$$

and this is shorter than one symbol period by the margin $t_m$ which nominally equals the introduced delay $t_{m0}$.

Thus, when the master device receives the last data pulse transmitted up from the slave, it has this margin, indicated by the reference numeral 250 in FIG. 26, before it is required to start the transmission of the first data pulse to the slave. This margin avoids problems caused by glitches and reflections at the transition.

This margin is provided by generating the clock BCKM_R timed slightly earlier than BCKM_T.

Similarly, the delay value $t_{ds}$ is used to set the slave transmit clock BCKS_T at a timing that is offset from the recovered receive clock BCKS_R.

In one example embodiment, the frame rate is 1.536 MHz, and so the superframe rate is 1.536 MHz/128=12 kHz. The bit rate is 1.536 MHz×N_Symbol, so may for example be 1.536 MHz×20.

There is thus described a system that allows for the efficient transmission of data over a half-duplex wired communication bus comprising separate wires for clock and data in an audio system, by compensating for the round-trip transmission delay comprising the transmission delay of a clock from master to slave and the transmission delay of data from slave to master.

It is noted that the embodiments described above may be used in a range of devices and systems, including, but not limited to audio systems comprising a portable communications device and an audio accessory.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of compensating for a round-trip transmission delay in an audio system comprising:
   a master device;
   a slave device; and
   a wired connection, suitable for connecting the master device and the slave device, and having at least two wires,
   the method comprising:
   transmitting a master clock signal on a first wire of the two wires, from said master device to said slave device;
   transmitting a synchronisation data pattern on a second wire of the two wires, from said slave device to said master device, wherein said synchronisation data pattern comprises signal level transitions at timings that are set based on a delay value stored in said slave device;
   in said master device, determining timings of said signal level transitions as received at said master device;
   transmitting, on the second wire, from said master device to said slave device, timing delay control data based on said determination; and
   in said slave device, receiving said timing delay control data; and updating said stored delay value based on said timing delay control data.

2. A method as claimed in claim 1, wherein the timings of the signal level transitions in said synchronisation data pattern are set based on the stored delay value, and based on the timing of the master clock signal, as received at the slave device.

3. A method as claimed in claim 2, wherein the timings of the signal level transitions in said synchronisation data pattern are set to be later than clock edges in the master clock signal, as received at the slave device, by the stored delay value.

4. A method as claimed in claim 1, comprising:
   repeatedly iterating the steps of transmitting the synchronisation data pattern, determining timings of said second signal level transitions, transmitting timing delay control data, receiving said timing delay control data, and updating said stored delay value based on said timing delay control data, until a termination condition is met.

5. A method as claimed in claim 1, comprising, in said master device, setting a timing point that is offset from clock edges of the master clock signal, and determining timings of said signal level transitions as received at said master device relative to said timing point.

6. A method as claimed in claim 5, comprising:
   determining whether said timings of said signal level transitions as received at said master device are early or late relative to said timing point.

7. A method as claimed in claim 6, comprising:
   transmitting said timing delay control data to retard or advance the timings of the signal level transitions in said synchronisation data pattern, depending on whether said timings of said signal level transitions as received at said master device are early or late relative to said timing point.

8. A method as claimed in claim 7, wherein said timing delay control data is adapted to retard or advance the timings of the signal level transitions in said synchronisation data pattern by a known step size.

9. A method as claimed in claim 8, wherein said known step size is varied from step to step.

10. A method as claimed in claim 9, comprising halving said known step size each time that the determination as to whether said timings of said second signal level transitions as received at said device are early or late relative to the desired timing produces a result that is opposite to an immediately preceding iteration.

11. A method as claimed in claim 1, wherein said timing delay control data transmitted from the master device to the slave device directly represents the delay to be applied within the slave device.

12. A method as claimed in claim 1, wherein said timing delay control data transmitted from the master device to the slave device comprises an indication of the step size and polarity by which the stored delay value needs to be increased or decreased.

13. A method as claimed in claim 1, wherein said timing delay control data transmitted from the master device to the slave device comprises an indication of whether the delay needs to be increased or decreased.

14. A method as claimed in claim 6, comprising determining whether said timings of said signal level transitions as received at said master device are early or late relative to the said timing point by comparing a signal level at the timing point with an expected signal level at the timing point.

15. A method as claimed in claim 14, comprising determining whether said timings of said signal level transitions as received at said master device are early or late relative to the said timing point by comparing an average signal level at the timing point, obtained over multiple transitions, with the expected signal level at the timing point.

16. A method as claimed in claim 14, comprising determining whether said timings of said signal level transitions as received at said master device are early or late relative to the said timing point by detecting whether signal levels at the timing point represent signal levels before or after the signal level transitions, and comparing the numbers of signal levels that represent signal levels before and after the signal level transitions, over multiple transitions.

17. A method as claimed in claim 1, further comprising, after performing said method, entering an operational mode.

18. A method as claimed in claim 17, comprising, in the operational mode, in each of a plurality of frames:
transmitting first payload data from said master device to said slave device;
transmitting second payload data from the slave device to said master device; and
transferring control data between the master device and the slave device,
wherein transmissions from the master device are synchronised to the master transmission clock, and wherein transmissions from the slave device are at timings determined by the stored delay value.

19. An audio system comprising:
a master device;
a slave device; and
a wired connection, suitable for connecting the master device and the slave device, and having at least two wires, wherein:
the master device is configured to transmit a master clock signal on a first wire of the two wires, to said slave device;
the slave device is configured to transmit a synchronisation data pattern on a second wire of the two wires, to said master device, wherein said synchronisation data pattern comprises signal level transitions at timings that are set based on a delay value stored in said slave device;
the master device is configured to determine timings of said signal level transitions as received at said master device;
the master device is further configured to transmit on the second wire, to said slave device, timing delay control data based on said determined timings; and
the slave device is configured to receive said timing delay control data, and to update said stored delay value based on said timing delay control data.

20. A method of compensating for a round-trip transmission delay in an audio system comprising:
a master device;
a slave device; and
a wired connection, suitable for connecting the master device and the slave device, and having at least two wires,
the method comprising, in the master device:
transmitting a master clock signal on a first wire of the two wires, to said slave device;
receiving from said slave device a synchronisation data pattern on a second wire of the two wires, wherein said synchronisation data pattern comprises signal level transitions at timings that are set based on a delay value stored in said slave device;
determining timings of said signal level transitions as received at said master device;
transmitting, on the second wire, to said slave device, timing delay control data based on said determination.

21. A master device, configured for forming part of an audio system further comprising:
a slave device; and
a wired connection, suitable for connecting the master device and the slave device, and having at least two wires,
the master device being further configured for:
transmitting a master clock signal on a first wire of the two wires, to said slave device;
receiving from said slave device a synchronisation data pattern on a second wire of the two wires, wherein said synchronisation data pattern comprises signal level transitions at timings that are set based on a delay value stored in said slave device;
determining timings of said signal level transitions as received at said master device; and
transmitting, on the second wire, to said slave device, timing delay control data based on said determination.

22. A method of compensating for a round-trip transmission delay in an audio system comprising:
a master device;
a slave device; and
a wired connection, suitable for connecting the master device and the slave device, and having at least two wires,
the method comprising, in the slave device:
receiving from said master device a master clock signal on a first wire of the two wires;
transmitting a synchronisation data pattern on a second wire of the two wires, to said master device, wherein said synchronisation data pattern comprises signal level transitions at timings that are set based on a delay value stored in said slave device;
receiving, on the second wire, from said master device, timing delay control data; and
receiving said timing delay control data; and updating said stored delay value based on said timing delay control data.

23. A slave device, configured for forming part of an audio system further comprising:
  a master device; and
  a wired connection, suitable for connecting the master device and the slave device, and having at least two wires,
  the slave device being further configured for:
  receiving from said master device a master clock signal on a first wire of the two wires;
  transmitting a synchronisation data pattern on a second wire of the two wires, to said master device, wherein said synchronisation data pattern comprises signal level transitions at timings that are set based on a delay value stored in said slave device;
  receiving, on the second wire, from said master device, timing delay control data; and
  receiving said timing delay control data; and updating said stored delay value based on said timing delay control data.

* * * * *

UNITED STATES PATENT AND TRADEMARK OFFICE
CERTIFICATE OF CORRECTION

PATENT NO. : 10,042,796 B2
APPLICATION NO. : 14/928430
DATED : August 7, 2018
INVENTOR(S) : Zwart It is certified that error appears in the above-identified patent and that said Letters Patent is hereby corrected as shown below:

In the Specification

1. In Column 3, Lines 27-28, delete "pass though" and insert -- pass through --, therefor.

2. In Column 9, Line 22, delete "single bit" and insert -- single bit. --, therefor.

3. In Column 11, Line 32, delete "command:" and insert -- command. --, therefor.

4. In Column 11, Line 59, delete "transfer" and insert -- transfer. --, therefor.

5. In Column 12, Line 6, delete "the a horizontal" and insert -- a horizontal --, therefor.

6. In Column 12, Line 42, delete "clock)" and insert -- clock). --, therefor.

7. In Column 13, Line 6, delete "bus 124" and insert -- bus 124. --, therefor.

8. In Column 16, Line 25, delete "CLCK_S," and insert -- CLOCK_S, --, therefor.

9. In Column 16, Line 27, delete "CLCK_S" and insert -- CLOCK_S --, therefor.

10. In Column 18, Line 53, delete "sequence though" and insert -- sequence through --, therefor.

11. In Column 23, Line 5, delete "n FIG." and insert -- in FIG. --, therefor.

Signed and Sealed this
Fourth Day of December, 2018

Andrei Iancu
*Director of the United States Patent and Trademark Office*